(12) United States Patent
Grubbs et al.

(10) Patent No.: US 8,791,219 B2
(45) Date of Patent: Jul. 29, 2014

(54) RAPIDLY CROSSLINKABLE ADHESIVES FOR BIOMEDICAL APPLICATIONS

(71) Applicants: Robert H. Grubbs, South Pasadena, CA (US); Hoyong Chung, Pasadena, CA (US); Michael Richard Harrison, San Francisco, CA (US)

(72) Inventors: Robert H. Grubbs, South Pasadena, CA (US); Hoyong Chung, Pasadena, CA (US); Michael Richard Harrison, San Francisco, CA (US)

(73) Assignees: California Institute of Technology, Pasadena, CA (US); The Regents Of The University Of California, Oakland, CA (US)

( * ) Notice: Subject to any disclaimer, the term of this patent is extended or adjusted under 35 U.S.C. 154(b) by 0 days.

(21) Appl. No.: 13/781,843

(22) Filed: Mar. 1, 2013

(65) Prior Publication Data

US 2013/0248109 A1    Sep. 26, 2013

Related U.S. Application Data

(60) Provisional application No. 61/615,068, filed on Mar. 23, 2012.

(51) Int. Cl.
| | |
|---|---|
| C08F 22/40 | (2006.01) |
| C08F 12/30 | (2006.01) |
| C08F 16/34 | (2006.01) |
| C08F 222/40 | (2006.01) |
| C04B 37/00 | (2006.01) |

(52) U.S. Cl.
USPC ........... 526/262; 526/289; 526/315; 524/548; 156/325

(58) Field of Classification Search
CPC .............................. C09J 139/04; C09J 133/26
USPC ............ 526/262, 289, 315; 524/548; 156/325
See application file for complete search history.

(56) References Cited

U.S. PATENT DOCUMENTS

| | | | |
|---|---|---|---|
| 8,030,413 B2 | 10/2011 | Lee | |
| 8,133,504 B2 | 3/2012 | Kettlewell et al. | |
| 2009/0163845 A1* | 6/2009 | Meyer-Ingold | 602/54 |
| 2010/0305626 A1 | 12/2010 | Stewart et al. | |

FOREIGN PATENT DOCUMENTS

| | | |
|---|---|---|
| EP | 0269420 | 6/1988 |
| GB | 2336156 | 10/1999 |
| WO | WO 2007/090384 | 8/2007 |

OTHER PUBLICATIONS

Hu et al., "Rational Design of Transglutaminase Substrate Peptides for Rapid Enzymatic Formation of Hydrogels", Journal of the American Chemical Society, 2003, 125, 14298-14299.
Huang et al., "Synthesis and Characterization of Self-Assembling Block Copolymers Containing Bioadhesive End Groups", Biomacromolecules, 2002, 3, 397-406.
Mehdizadeh et al., "Design Strategies and Applications of Tissue Bioadhesives", Macromolecular Bioscience, 2012, 1-18.
Mehdizadeh et al., "Injectable citrate-based mussel-inspired tissue bioadhesives with high wet strength for sutureless wound closure", Biomaterials, 2012, 33, 7972-7983.
Stewart, "Protein-based underwater adhesives and the prospects for their biotechnological production", Appl. Microbiol. Biotechnol., 2011, 89, 27-33.
Wack et al., "Water-Swellable Materials-Application in Self-Healing Sealing Systems", Proceedings of the First International Conference on Self Healing Materials, Apr. 18-20, 2007, 9 pages.

* cited by examiner

*Primary Examiner* — William Cheung
(74) *Attorney, Agent, or Firm* — Baker & Hostetler LLP

(57) ABSTRACT

The present inventions are directed to novel medical adhesives and their use, for example, in biomedical applications. These compositions and applications allow for improved adhesion with and between mammalian tissues.

37 Claims, 13 Drawing Sheets

Synthesis of Adhesives, Poly(AA-co-AANHS-co-MDOPA); $x = 15$, $y = 15$, and $z = 70$

MDOPA  AANHS  AA

MDOPA: N-methacryloyl 3,4-dihydroxyl-L-phenylalanine
AAHNS: N-hydroxysuccinimide ester
AA: Acrylic Acid
AIBN: Azobisisobutyronitrile
DMF: N,N-Dimethylformamide

RAPIDLY CROSSLINKABLE ADHESIVES FOR BIOMEDICAL APPLICATIONS

CROSS REFERENCE TO RELATED APPLICATIONS

This application claims priority to U.S. Application No. 61/615,068, filed Mar. 23, 2012, which is incorporated by reference herein in its entirety.

TECHNICAL FIELD

The present invention relates, at least in part, to medical adhesives and their use in prophylactic and remedial wound treatment.

BACKGROUND

Many medical polymer adhesives have been developed for a variety of purposes, such as closing wounds in tissue, preventing fluid leakage, and repairing damaged tissue. There are a few examples of successful medical polymer adhesives including cyanoacrylates (Indermil™, Dermabond™), glutaraldehyde-albumin reaction-based adhesives (BioGlue™), succinimidyl-thiol reaction-based adhesives (Coseal™), and fibrin-based adhesives. These biomedical adhesives are commercially available and used in surgical applications. However, even with these successful results, various surgical conditions require new and better polymeric adhesives. A major challenge for improved biomedical adhesive is that the human body is composed of 60% of water and most of human body is wet except the outer skin. Internal human organs are always wet with physiological fluids such as blood and mucus. Therefore, (1) strong wet adhesion capability is important for medical polymer adhesives. In addition to strong wet adhesion, a biomedical adhesive must be (2) non-toxic and without an immune response, (3) stable under physiological conditions, (4) rapidly cross-linkable without generation of heat, and (5) flexibility for use with soft organs and membranes. Additionally, more applications are possible if the adhesive can be delivered by syringe injection. New medical adhesives are required which meet these criteria.

SUMMARY

The present inventions are directed to novel medical adhesives and their use, for example, in biomedical applications. These compositions and applications allow for improved adhesion with and between mammalian tissues.

Various embodiments provide medical adhesive compositions, each composition comprising a copolymer comprising separate water-soluble units, interfacial adhesive units, and crosslinkable units. In some embodiments, the water-soluble units are derivatives of (meth)acrylic acid. As used herein, the term "derivatives of (meth)acrylic acid" includes derivatives of methacrylic acid and derivatives of acrylic acid. In other embodiments, the interfacial adhesive units comprising hydroxy- or polyhydroxyphenyl moieties, for example 3,4-dihydroxy-phenyl alanine moieties. In still other embodiments, the crosslinkable units comprising maleimide, N-hydroxysuccinimide, amine, aldehyde, or thiol moeities. In more specific embodiments, the copolymer is a terpolymer of acrylic acid, acrylic acid N-hydroxysuccinimide ester, and N-methacryloyl 3,4-dihydroxy-phenylalanine. In some embodiments, these compositions are adapted for human use.

The copolymers may be water-swellable, water-swollen, or both. In some embodiments, the water-swollen copolymers exhibit shear thinning behavior. In other embodiments, the water-swollen polymers are crosslinked by a crosslinking agent, so as to form covalent bonds between the crosslinkable units and the crosslinking agents.

The invention also describes methods of preparing medical adhesive compositions, each method comprising copolymerizing a homogeneous mixture of acrylic acid (AA), acrylic acid N-hydroxysuccinimide ester (AANHS), and N-methacryloyl 3,4-dihydroxy-phenylalanine (MDOPA) in a solvent in the present of a free radical initiator to form a solid copolymer.

Further embodiments provide for kits, each kit comprising a sterile package containing a medical adhesive composition and a crosslinking agent. In some cases, these kit compositions are adapted and acceptable for human use.

Still further embodiments provide methods for attaching two or more substrates to one another, each method comprising contacting each substrate with an adhesive composition described herein for a time sufficient that the substrates are attached to one another. In some cases, these methods further comprise admixing the adhesive composition with a crosslinking agent. The substrates may comprise biological or non-biological materials.

BRIEF DESCRIPTION OF THE DRAWINGS

The present application is further understood when read in conjunction with the appended drawings. For the purpose of illustrating the subject matter, there are shown in the drawings exemplary embodiments of the subject matter; however, the presently disclosed subject matter is not limited to the specific methods, devices, and systems disclosed. In addition, the drawings are not necessarily drawn to scale. In the drawings:

FIG. 10 illustrates the methodology of using a presealant to prevent amniotic fluid from leaking; sealant injected between uterus wall and fetal membrane prior to medical device puncture.

DETAILED DESCRIPTION OF ILLUSTRATIVE EMBODIMENTS

Figure 1A:
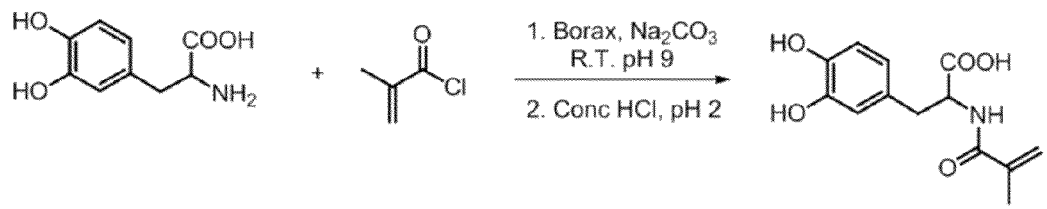
FIG. 1 provides schematic illustrations of schemes for the syntheses of the acrylic acid derivatives of an exemplary adhesive (FIG. 1A), an exemplary adhesive, poly(AA-co-AANHS-co-MDOPA) (FIG. 1B), an exemplary thiolated PEG glycerol crosslinking agent (FIG. 1C), and the crosslinked structure that results from the mixture of the exemplary adhesive and crosslinking agent (FIG. 1D).
Figure 1A:
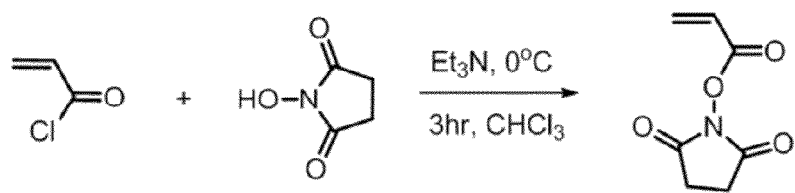
Figure 1B:
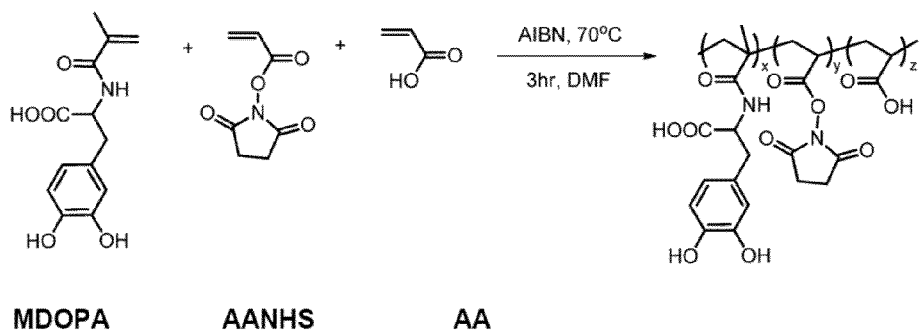

The present invention may be understood more readily by reference to the following description taken in connection with the accompanying Figures and Examples, all of which form a part of this disclosure. It is to be understood that this invention is not limited to the specific products, methods, conditions or parameters described and/or shown herein, and that the terminology used herein is for the purpose of describing particular embodiments by way of example only and is not intended to be limiting of any claimed invention. Similarly, unless specifically otherwise stated, any description as to a possible mechanism or mode of action or reason for improvement is meant to be illustrative only, and the invention herein is not to be constrained by the correctness or incorrectness of any such suggested mechanism or mode of action or reason for improvement. Throughout this text, it is recognized that the descriptions refer to compositions and methods of making and using said compositions. That is, where the disclosure describes and/or claims a feature or embodiment associated with a composition or a method of making or using a composition, it is appreciated that such a description and/or claim is intended to extend these features or embodiment to embodiments in each of these contexts (i.e., compositions, methods of making, and methods of using).

In the present disclosure the singular forms "a," "an," and "the" include the plural reference, and reference to a particular numerical value includes at least that particular value, unless the context clearly indicates otherwise. Thus, for example, a reference to "a material" is a reference to at least one of such materials and equivalents thereof known to those skilled in the art, and so forth.

When a value is expressed as an approximation by use of the descriptor "about," it will be understood that the particular value forms another embodiment. In general, use of the term "about" indicates approximations that can vary depending on the desired properties sought to be obtained by the disclosed subject matter and is to be interpreted in the specific context in which it is used, based on its function. The person skilled in the art will be able to interpret this as a matter of routine. In some cases, the number of significant figures used for a particular value may be one non-limiting method of determining the extent of the word "about." In other cases, the gradations used in a series of values may be used to determine the intended range available to the term "about" for each value. Where present, all ranges are inclusive and combinable. That is, references to values stated in ranges include every value within that range.

It is to be appreciated that certain features of the invention which are, for clarity, described herein in the context of separate embodiments, may also be provided in combination in a single embodiment. That is, unless obviously incompatible or specifically excluded, each individual embodiment is deemed to be combinable with any other embodiment(s) and such a combination is considered to be another embodiment. Conversely, various features of the invention that are, for brevity, described in the context of a single embodiment, may also be provided separately or in any sub-combination. Finally, while an embodiment may be described as part of a series of steps or part of a more general structure, each said step may also be considered an independent embodiment in itself, combinable with others.

When a list is presented, unless stated otherwise, it is to be understood that each individual element of that list, and every combination of that list, is a separate embodiment. For example, a list of embodiments presented as "A, B, or C" is to be interpreted as including the embodiments, "A," "B," "C," "A or B," "A or C," "B or C," or "A, B, or C."

Throughout this specification, words are to be afforded their normal meaning, as would be understood by those skilled the relevant art. However, so as to avoid misunderstanding, the meanings of certain terms will be specifically defined or clarified.

The present invention includes embodiments related to medical adhesive compositions, each composition comprising a copolymer comprising separate water-soluble units, interfacial adhesive units, and crosslinkable units.

The term "copolymer" is used to reflect that the polymer comprises these three separate types of units, and not necessarily the means of their preparation. The term "unit" is used to describe a repeating group within a copolymer backbone, such as derived from a related monomer or oligomer.

These copolymers may include naturally derived materials, but are generally considered synthetic materials, in the sense that, as a whole, they are not found in nature or can merely be extracted from natural products (e.g., are not merely peptide copolymers). While the copolymers are not necessarily limited by their method of preparation, they may be prepared by any number of conventional synthetic methods, including free radical polymerization, ring opening metathesis polymerization (ROMP), atom transfer radical polymerization (ATRP), nitroxide mediate polymerization (NMP), or reverse addition-fragmentation chain transfer polymerization (RAFT) of the respective monomers. The resulting copolymers may have any one of an array of architectures, including linear, comb shape graft (or brush) or branched multiarm architectures, or combinations thereof.

The terms "water-soluble units," "interfacial adhesive units," and "crosslinkable units" also each have specific connotations.

The term "water-soluble units" refers to those units which contain at least one type of hydrophilic moiety. Unless otherwise indicated, the term "water-soluble units" refers to those units which, if formed into a homopolymer of comparable Mw of the copolymer, would dissolve in water at room temperature. Other specific embodiments provide water-soluble units which include those where at least about 50 wt %, at least about 75 wt %, at least about 85 wt %, at least about 95 wt %, at least about 98 wt %, as well as when all of the corresponding homopolymer would dissolve in water at room temperature. Such degree of dissolution may be shown by light scattering (including Rayleigh scattering or turbidity) or transmission techniques, such as are known in the art.

Certain additional embodiments also provide that the "water-soluble units" may be defined in terms of units having at least one pendant hydroxy or ionizable groups, including, e.g., carboxylic acids, amines (including quaternary amines), betaine, sulfate, or phosphate groups, and/or oligomers or polymers of ethylene glycol (PEG), polysaccharides, or cellulosic backbone linkages or pendants. Such water-soluble units may be derived from monomers capable of providing water-soluble vinyl polymers, water-soluble poly(meth)acrylates, water-soluble polyamides, water-soluble polyesters, water-soluble polyurethanes, xanthan gums, sodium alginates, galactomanans, carageenan, gum arabic, cellulose and its derivatives, such as hydroxyethyl cellulose and hydroxypropyl cellulose, starch and its derivatives, guar and its derivatives, proteins and their derivatives, water-soluble poly (vinyl alcohol), water-soluble poly (vinyl amine), water-soluble poly(ethylene imine), water-soluble amine/epihalohydrin polyamines, water-soluble vinyl pyrrolidone, water-soluble poly(meth)acryloyloxytetraalkyl ammonium salts (e.g., halides), or mixtures thereof.

In other exemplary, non-limiting example, water-soluble units may be derived from monomers or oligomers of citraconic acid, itaconic acid, (meth)acrylamide, (meth)acrylic acid, 2-hydroxyethylmethacrylate, 2-hydroxyethylacrylate, polyethylene glycol (PEG) (meth)acrylate (PEG having Mw in a range of from about 10 to about 1000, about 10 to about 5000, about 10 to about 1000, about 10 to about 500, about 10 to about 100, or about 10 to about 50 dalton), N-vinyl pyrrolidone, vinyl alcohol, N,N-dimethylacrylamide, ethylene glycol dimethacrylate, carboxybetaine, N-isopropylacrylamide, 2-aminoethyl methacrylate, 2-(dimethylamino)ethyl (meth)acrylamide, N-(3-aminopropyl)-(meth)acrylate, or mixtures thereof.

For the sake of absolute clarity, as used herein, the convention of using the parenthetical "(meth)," as in "(meth)acrylamide" and (meth)acrylic acid is intended to connote independent embodiments of acrylamide [and] methacrylamide and acrylic acid [and] methacrylic acid, respectively, or derivatives thereof.

Embodiments where the water-soluble units are derived from or are analogs of (meth)acrylic acid are preferred, and those derived from or are analogs of acrylic acid are especially preferred.

Unless otherwise indicated, the term "interfacial adhesive units" refers to those units capable of adhering to biological and non-biological surfaces, but especially tissue surfaces, including those which are "wet" with aqueous solutions (i.e., coated with fluids including water, saline, aqueous buffers, or physiological fluids such as mucus or blood). Such adherence may be result from covalent, ionic, hydrogen, or van der Waals bonding. Most typically these interfacial adhesive units comprise pendant polyhydroxy or hydroxy- or polyhydroxyaryl moieties. Such polyhydroxyaryl moieties may include those having di-hydroxyphenyl (catechol or resorcin) and tri-hydroxyphenyl (e.g., pyrogallate)-type moieties, wherein the di- or tri-hydroxyphenyl moieties are connected to the copolymer backbone by an optional linking moiety. As used herein, the term "linking moiety" refers to an atom or a collection of atoms used to link interconnected moieties, such as the polymer backbone and the polyhydroxyaryl moieties. The linker moieties are preferably, but not necessarily, hydrolytically stable. Similarly, these linking moieties may or may not include a physiologically hydrolyzable or enzymatically degradable linkage. In certain embodiments, these linking moieties comprise $C_1$-$C_6$ alkyl or alkoxy, amido, amino acid, ester, or polyglycol groups, or combinations thereof. In some embodiments, the interfacial adhesive units may comprise polypeptide moieties derived from mussel-based polyphenolic proteins. These interfacial linking units may also comprise 3,4-dihydroxy-phenyl alanine (DOPA) moieties, and particularly 3,4-dihydroxy-L-phenyl alanine (L-DOPA) moieties. Also, in preferred embodiments, the interfacial adhesive units are derivatives or analogs of (meth)acrylic acid (see examples below).

The separate "crosslinkable units" of the present invention are to be distinguished from the other units (including the interfacial units), in that the crosslinkable units provide effectively no adhesive character to the composition, rather providing structural integrity when crosslinked. Unlike other adhesive compositions using, for example DOPA moieties, the presence of the separate crosslinkable units in the present invention can provide improved interfacial adhesion properties, because the DOPA is not consumed by crosslinking. The impact of the presence of the crosslinkable units can be striking, with significant improvements in performance being realized with their content as low as 0.001 mole percent.

Suitable crosslinkable units comprise functional groups which, when combined with appropriate cross-linking agents, can form covalent bonds quickly at ambient or physiological (patient body) temperatures within about 20, about 10, about 5, about 2, or about 1 minute of contacting between the functional groups of the crosslinking agents and the functional groups of the crosslinkable units. Preferably, these functional groups do not include moeities which react with phenolic hydroxides under similar conditions (i.e., so as to compromise the availability of these functional groups in the interfacial adhesive units). As described further below, crosslinkable units may independently comprise maleimide, N-hydroxysuccinimide, amine, aldehyde, or thiol moeities and exemplary covalent bonds may be those resulting from a maleimide-thiol group reaction, an N-hydroxysuccinimide ester-thiol group reaction, an amine-aldehyde group reaction, or a transglutaminase enzyme-amine group reaction. In preferred embodiments, these crosslinkable units comprising N-hydroxysuccinimide moeities. In other preferred embodiments, the crosslinkable units are derivatives or analogs of (meth)acrylic acid (see examples below).

The description of the crosslinkable units as separate (and so distinct) from either the water-soluble or interfacial adhesive units is intended to connote that the functional groups of the crosslinkable units are measurably more reactive to form covalent crosslinks (with an appropriate crosslinking agent) than are the functional groups associated with the water-soluble or interfacial adhesive units. Also, while the crosslinkable units may contain moieties having some hydrophilic character, their ability to function as water-soluble" units are generally insufficient to be considered as such. The crosslinkable units function so as to provide structural integrity to the crosslinked copolymers without compromising the performance of the other units—i.e., without involving the functional moieties of either the water-soluble or interfacial adhesive units.

The separate water-soluble units, interfacial adhesive units, and crosslinkable units of these (non-crosslinked) medical adhesive compositions may be arranged in mixed block segments within the copolymers. Note that the term "segment" is intended to connote a portion of the copolymer composed either entirely of a particular type of unit or of sufficient amounts of such units as to engender that portion of the copolymer with the character of the predominant unit. Preferably the various units are each randomly distributed throughout the copolymer. The term "randomly distributed" is intended to connote a distribution throughout the polymer reflecting the statistical composition of the units. It is preferred, but not required, that each of the units is a separate derivative or analog of a common monomer base, for example, of a (meth)acrylic acid.

In certain independent embodiments, the weight-averaged molecular weight (Mw) of the non-crosslinked copolymer will be at least about 2000 daltons, at least about 5000 daltons, at least about 10,000 daltons, at least about 20,000 daltons, or at least 25,000 or 50,000 daltons. In related independent embodiments, the molecular weight of the non-crosslinked copolymer will be less than about 10,000,000, less than about 5,000,000, less than about 2,500,000, less than about 1,000,000, or less than about 500,000 daltons. The actual molecular weight of the non-crosslinked copolymer is determined based on the intended use and properties desired final product. The molecular weight of the non-crosslinked copolymer may be any value or any range of values inclusive of those stated above. For the acrylic acid-based copolymers described in greater detail below, a weight-averaged molecular weight in a range of from about 2000 to about 1,000,000 daltons appears to be preferred. The Mw of the copolymers may be determined by conventional GPC (gel permeation chromatography), by viscometry of dilute dilute polymer solutions, by diffusion ordered NMR spectroscopy (DOSY) using diffusion coefficients of polymers in solution, or by Matrix-Assisted Laser Desorption/Ionization-Time of Light Mass Spectrometry (MALDI-TOF MS). MALDI-TOF MS is perhaps the most direct method for determining Mw and Mw distributions in a polymer sample, and is preferred on this basis. For those systems for which MALDI-TOF MS is not appropriate, GPC methods (e.g., using DMF or water eluents) are also especially useful. The specific conditions of each test depend on the specific nature of the copolymer, and the skilled artisan would be capable of defining and measuring to such conditions.

In preferred embodiments, the copolymers comprising separate water-soluble units, interfacial adhesive units, and crosslinkable units are water-swellable but not water-soluble—i.e., the balance between water-soluble and water-insoluble units or segments in the copolymer provides a composition that swells in the presence of water, aqueous solution, or physiological fluid but does not dissolve to any appreciable extent in those fluids—e.g., less than about 25 wt %, about 20 wt %, about 15 wt %, about 10 wt %, about 5 wt %, or about 2 wt % of the total dry weight copolymer composition that goes into solution and is separable by filtration on exposure of the co-polymer to water, aqueous solution, or physiological fluid. The skilled artisan would understand how to vary Mw and composition, within the parameters described herein, to achieve these ends.

The water-swellable copolymers are capable of absorbing at least about 50%, at least about 100%, at least about 200%, or at least about 500% of their dry weight in water, aqueous solution, or physiological fluids to form "water-swollen" hydrogel copolymers. From these descriptions, it should also be apparent to the skilled artisan that the terms "water-swellable" or "water-swollen," while incorporating the term "water," may also be those copolymers swellable, swollen, or imbibed by aqueous solutions (e.g., saline, electrolyte, or phosphate buffers) or physiological fluid (e.g., serum, plasma, blood, or mucosal fluid).

The molecular weight, Mw, and the relative proportions of the various units are selected to realize this water-swellable effect. For example, in certain embodiments where the copolymer contains acrylic acid backbones, such as further described below, it has been shown that good results can be achieved when the water-soluble units are present in a range of from about 50 to about 95 mole percent, the interfacial adhesive units are present in a range of from about 5 to about 50 mole percent, and the crosslinkable units are presence present in a range of about 0.001 to about 25 mole percent, in each case the term "mole percent" being defined with respect to the total number of moles of repeating units in the copolymer. These proportions are not limited to these acrylic copolymers and other terpolymers may have similar mole percentage compositions. These ranges represent embodiments of other polymer compositions as well, but it should be appreciated that, depending on the relative hydrophilicity/hydrophobicity of the various types of units, it might be expected that slightly different ranges would provide optimal performance, and it would be within the skill of one or ordinary skill to define these for a particular system, given the descriptions herein. Accordingly, in other independent embodiments, the water-soluble units are present in a range bounded at the lower end by a value of about 50, about 55, about 60, about 65, or about 70 mole percent and at the upper end by a value of about 95, about 90, about 85, about 80, or about 70 mole percent, exemplified by non-limiting ranges of from about 60 to about 80 mole percent, from about 65 to about 75 mole percent, or about 70 mole percent. The interfacial adhesive units may be present in the compositions in a range bounded at the lower end by a value of about 5, about 10, about 15, about 20, or about 25 mole percent, further exemplified by non-limiting ranges of from about 10 to about 20 mole percent or about 15 mole percent. Similarly, independent embodiments provide that the crosslinkable units are present in a range bounded at the lower end by a value of about 0.001, about 0.01, about 0.1, about 1, about 5, or about 10 mole percent and at the upper end by a value of about 25, about 20, about 15, about 10, or about 5 mole percent with additional exemplary non-limiting ranges including those of from about 0.001 to about 20 mole percent, about 0.01 to about 20, about 0.1 to about 15, about 1 to about 15, or about 15 mole percent.

To this point, the compositions have been described in terms of comprising separate water-soluble units, interfacial adhesive units, and crosslinkable units. It should be appreciated that such compositions may also contain units or segments which provide none of these functions—i.e., which are not water-soluble or provide no adhesive or crosslinking character, but are present for some other purpose. For example, alkyl, aryl, or other non-polar, non-reactive units or segments (e.g., alkyl, alkylene, styryl, etc.) may be present within the copolymer for other purposes including to affect rheology or to contain or provide for the attachment of molecular labels or markers.

Similarly, each of the separate water-soluble units, interfacial adhesive units, and crosslinkable units may contain one or more than one type of units within its given class—e.g., the water-soluble units may comprise one or more types of water-soluble units, the interfacial adhesive units may comprise one or more types of interfacial adhesive units, and the crosslinking units may comprise one or more types of crosslinking units. In certain embodiments, though, the copolymer is a terpolymer, containing only one type of water-soluble unit, interfacial adhesive unit, and crosslinkable unit. For example, the medical adhesive composition may comprise a terpolymer of acrylic acid (AA), acrylic acid N-hydroxysuccinimide ester (AANHS), and N-methacryloyl 3,4-dihydroxy-phenylalanine (MDOPA). While the relative ratios of AA, AANHS, and MDOPA may be within any of the ranges described above, in certain embodiments, the mole ratio of AA:AANHS:MDOPA is about 70:15:15.

It should be apparent from the descriptions thus far that the invention contemplates essentially anhydrous ("water-swellable") copolymers, as well as hydrated ("water-swollen" or hydrogel compositions). The rate of water uptake by the anhydrous ("water-swellable") copolymers upon admixing with water depends on the particular composition and structure of the copolymer, and the compositions are fairly flexible in this regard. Fast swelling may be desirable though, and in some embodiments, the compositions of the present invention include those where such swelling can be achieved in less than 30 minutes, less than about 10 minutes, less than about 5 minutes, or less than about 1 minute, for example in 30 seconds.

The viscosities of the water-swollen copolymers may vary over a wide range, depending on their compositions and architectures. In certain embodiments, they may be characterized by having viscosities in a range of from about 10 to about 100,000 Pa·s, at a shear rate up to about 100 s$^{-1}$. In this context, the term "characterized by" can mean either that the water-swollen polymers exhibit these properties or be defined by these properties. In other embodiments, the copolymers may be characterized by having viscosities having a range having a lower limit of about 5, 10, 50, 100, 500, or 1000 Pa·s and an upper limit of from about 50,000, about 10,000, about 5,000, or about 1,000 Pa·s, again at a shear rate up to about 100 s$^{-1}$. In preferred embodiments, water-swollen compositions can exhibit a viscosity lower than about 1000 Pa·s, when a shear in a range of about 0.1 to about 10 s$^{-1}$ is applied at ambient room temperature (23° C.).

Similarly, an important attribute of the water-swollen compositions of the present invention is their ability to exhibit shear thinning, a property characteristic of their hydrogel nature, thereby making them useful for injecting through needles or cannulas. Injectable adhesives should exhibit such shear thinning behavior when a shear rate in a range of from about 10 to about 500 s$^{-1}$ (preferably in a range of from about 10 to about 100 s$^{-1}$) is applied at ambient or physiological temperatures, and the resulting shear-thinned viscosity should be less than about 10 Pa·s, preferably less than about 1 Pa·s, and more preferably less than about 0.1 Pa·s. As shown below (see, e.g., FIG. 4), in certain embodiments, the compositions exhibit shear thinning behavior at (a) a shear rate of greater than 70 s$^{-1}$ at ambient room temperature (e.g., about 23° C.) or (b) at a shear rate of greater than 30 s$^{-1}$ at physiological temperatures (e.g., about 38° C.), or both (a) and (b).

To this point, the disclosure has described compositions comprising non-crosslinked copolymers, though it should be apparent that the invention also contemplates those embodied compositions in which crosslinking agents are present as such and those where the crosslinking agents have crosslinked the medical adhesive compositions. Described in another way, these additional embodiments include those where any of the compositions described above further comprise at least one crosslinking agent, the crosslinking agent capable of forming covalent bonds with the crosslinkable units present in the copolymer. Other embodiments provide those compositions where the added crosslinking agent has or is forming covalent bonds with the crosslinkable units present in the copolymer.

Such crosslinking agents may be or comprise a molecule having two, three, or four, or more reactive sites per molecule. Said reactive sites may include maleimide, N-hydroxysuccinimide, amine, aldehyde, or thiol moeities and be selected so as to complement the functional groups of the crosslinkable units of the copolymer, so as to form covalent bonds resulting from a maleimide-thiol group reaction, an N-hydroxysuccinimide ester-thiol group reaction, an amine-aldehyde group reaction, or a transglutaminase enzyme-amine group reaction. Preferred exemplary crosslinking agents include at least one thiol derivative of a partially or completely ethoxylated glycerol, a partially or completely ethoxylated trimethylol propane, or a partially or completely ethoxylated pentaerythritol, such that when reacted with an N-hydroxysuccinimide functional group of the crosslinking unit, forms covalent bonds resulting from an N-hydroxysuccinimide ester-thiol group reaction.

The compositions of the present invention may be, but are not necessarily, directed to mammalian use, including for use on humans, and in certain embodiments the compositions and methods are adapted so as to be acceptable for these purposes. While not necessarily required for all applications, in such cases where the compositions are contemplated for use, or are actually used, with mammals, including humans, it is at least highly preferred that the compositions be made of materials and be of sufficient character as to be acceptable for medical applications (in some cases for use as implantable materials); e.g., as appropriately recognized acceptable by the U.S. Food and Drug Administration or analogous other regulatory agency in other countries.

Additional embodiments include kits, each kit comprising a sterile package containing a medical adhesive composition of the non-crosslinked copolymer (water-swellable or water-swollen) and a crosslinking agent. These kits may also contain devices, such as dual port needles or cannulas, which provide for co-injection of the copolymers and the crosslinking agents. In preferred embodiments, the components of these kits are adapted and acceptable for human use.

In addition to the compositions already discussed, the invention contemplates methods of preparing such compositions and compositions resulting from these preparations (to the extent that they may differ from the compositions already described). As described above, the copolymers may be prepared by any number of conventional synthetic methods, including free radical polymerization, ring opening metathesis polymerization (ROMP), atom transfer radical polymerization (ATRP), nitroxide mediate polymerization (NMP), or reverse addition-fragmentation chain transfer polymerization (RAFT) of the respective monomers. The resulting copolymers may have any one of an array of architectures, including linear, comb shape graft (or brush) or branched multiarm architectures. Once the copolymer is prepared and isolated, using preparative methods which are known, though not for the specific compositions described herein, the copolymers may be hydrated and swollen by the addition of water or aqueous solution or mixture, applied to an appropriate substrate, and optionally crosslinked using an appropriate crosslinking agent described above.

In one non-limiting example, described in much greater detail below in Examples 1.2 to 1.4, the method comprises copolymerizing a homogeneous mixture of acrylic acid ("AA"), acrylic acid N-hydroxysuccinimide ester ("AANHS"), and N-methacryloyl 3,4-dihydroxyl-L-phenylalanine ("MDOPA") in an appropriate solvent in the present of a free radical initiator, preferably under inert atmosphere (e.g., argon or nitrogen) to form a solid copolymer. Along with the information provided herein, the skilled artisan would be expected to know appropriate reactants, solvent, and initiators, given the teachings provided herein. One such preferred solvent is dimethyl formamide ("DMF"), and one preferred radical initiator is AIBN. Once the resulting polymer is isolated from the reaction mixture, it may be swollen with water, or other aqueous solution or physiological fluid, to form a water-swollen adhesive and optionally admixed and crosslinked with an appropriate crosslinking agent. In this specific example, an exemplary crosslinking agent comprises a thiolated derivative of ethoxylated glycerol. In other embodiments, crosslinking may be achieved by the addition of a catalyst, or the application of electromagnetic or thermal radiation, pressure, or a combination thereof.

In addition to the compositions and methods of making the compositions described herein, this invention contemplates the use of the compositions as adhesives, particularly for use on mammalian tissue, and further for use on human tissue. Certain embodiments, then, provide methods for fastening at least two substrates together, each method comprising contacting the substrates with any of the compositions described herein for a time and under conditions sufficient so that the substrates attach to one another. In this regard, separate independent embodiments provide that (a) the compositions applied to the substrate(s) are the non-crosslinked, swollen copolymers described herein and (b) that the crosslinking agents are admixed with the non-crosslinked, swollen copolymers either (i) before or (ii) after the compositions are applied to the substrate(s). In the latter cases, the non-crosslinked, swollen copolymers may be physically admixed with a crosslinking agent, for example by stirring, or by shear mixing associated with co-injection of the two components to the location of interest, or by layering the crosslinking agent and adhesive compositions and sandwiching the layers between two substrates. The substrates may be "dry" or "wet," these terms reflecting the relative amounts or water, aqueous solution, or physiological fluids on the surface of the substrate at the point or area of contact with the adhesive composition(s).

As used herein, the term "for a time and under conditions sufficient" is intended to connote the temporal and physical conditions necessary to provide that the substrates become physically attached to one another—e.g., the application of heat or pressure until a bond is formed between the substrate(s) and/or the adhesive composition, such that the substrates remained joined to one another after the electromagnetic or thermal radiation, or pressure is removed or discontinued. Some exemplary measures of bonding and bond strength are described below.

The substrates may comprise biological or non-biological materials. Certain independent embodiments provide that at least one substrate (i.e., one, two, or more) is a non-biological material.

Exemplary non-limiting non-biological materials include planar, woven, or non-woven sheets, fibers or fibrils, or nanodimensioned carbon, (natural or synthetic) organic and inorganic polymers and metals. Such materials may be used, for example, as bandages (e.g., patches or butterfly sutures), coverslips, reinforcing elements, or the like within or adjacent to the adhesive compositions.

Further, the non-biological materials may comprise naturally occurring, synthetic (i.e., not found in nature), biocompatible, biodegradable, non-biodegradable, and/or bioabsorbable materials. The term "biocompatible polymer material" refers to a polymer (synthetic or natural) which when in contact with cells, tissues or body or physiological fluid of an organism does not induce adverse effects such as immunological reactions and/or rejections or the like. A biocompatible polymer can also be a biodegradable polymer. The term "biodegradable polymer" refers to a polymer (again, synthetic or natural) which can be degraded (i.e., broken down) in the physiological environment. By contrast, "non-biodegradable are not degraded (i.e., broken down) in the physiological environment. The term "bioabsorbable" refers to those polymers which are absorbed within the host body, either through a biodegradation process, or by simple dissolution in aqueous or other body fluids. Water soluble polymers, such as poly(ethylene oxide) are included in this class of polymers. Materials comprising carbon and inorganic polymers (structured ceramics or glasses) include woven sheets, fibers, fibrils, nanofibrils, or nanotubes.

Given the nature of the adhesive compositions described herein, preferred embodiments include those where at least one substrate (i.e., one, two, or more), and preferably at least two substrates, is a biological material, for example a biological tissue. Such biological tissue substrate may comprise a dermal or mucosal tissue substrate, external to or excised from the body of a patient (or both), the patient being a mammal generally, and a human, specifically. The tissues may be spatially arranged to abut one another (for example, closing a cut in the skin) or to partially or wholly overlap one another (i.e., the surface of one tissue substrate lying partially or entirely over the surface of a second tissue substrate. In certain other embodiments, at least one or at least two of the substrate comprises an internal membrane tissue. Exemplary tissues include the mucosal surfaces lining intestine, epithelial surfaces lining pulmonary, biliary, and urinary tracts, mucosal surface(s) of fallopian tubes (tubal obstruction), and epithelial surfaces like peritoneum (hernia closure). It should be appreciated that application of the adhesive compositions within the body of a patient, including between tissue layers of a body of a patient, may be achieved by applying the compositions to tissues layers which have been exposed by surgery or by injecting the compositions (including co-injecting the non-crosslinked compositions and crosslinking agents) between the tissues of a patient. The latter is exemplified further in Example 2.

The following listing of embodiments in intended to complement, rather than displace or supersede, the previous descriptions.

Item 1. A medical adhesive composition for mammalian use, said composition comprising a copolymer comprising separate water-soluble units, interfacial adhesive units, and crosslinkable units.

Item 2. The medical adhesive composition of item 1, the water-soluble units being derived from citraconic acid, itaconic acid, (meth)acrylamide, (meth)acrylic acid, 2-hydroxyethylmethacrylate, 2-hydroxyethylacrylate, polyethylene glycol (PEG) (meth)acrylate (PEG having 10-1000 MW), N-vinyl pyrrolidone, vinyl alcohol, N,N-dimethylacrylamide, ethylene glycol dimethacrylate, carboxybetaine, N-isopropylacrylamide, 2-aminoethyl methacrylate, 2-(dimethylamino)ethyl (meth)acrylamide, N-(3-aminopropyl)-(meth)acrylate, or mixtures thereof.

Item 3. The medical adhesive composition of item 1, the water-soluble units being derived from (meth)acrylic acid.

Item 4. The medical adhesive composition of any one of items 1 to 3, the interfacial adhesive units comprising hydroxy- or polyhydroxyphenyl moieties.

Item 5. The medical adhesive composition of any one of items 1 to 4, the interfacial adhesive units comprising 3,4-dihydroxy-phenyl alanine moieties.

Item 6. The medical adhesive composition of item 5, the interfacial adhesive units comprising 3,4-dihydroxy-L-phenyl alanine moieties.

Item 7. The medical adhesive composition of any one of items 1 to 6, the crosslinkable units comprising maleimide, N-hydroxysuccinimide, amine, aldehyde, or thiol moeities.

Item 8. The medical adhesive composition of item 7, the crosslinkable units comprising N-hydroxysuccinimide moeities.

Item 9. The medical adhesive composition of any one of items 1 to 8, the separate water-soluble units, interfacial adhesive units, and crosslinkable units being randomly distributed throughout the copolymer.

Item 10. The medical adhesive composition of any one of items 1 to 8, at least one set of the water-soluble units, interfacial adhesive units, or crosslinkable units being present as a block segment within the copolymer.

Item 11. The medical adhesive composition of any one of items 1 to 10, the copolymer having been prepared by free radical polymerization, ring opening metathesis polymerization (ROMP), atom transfer radical polymerization (ATRP), nitroxide mediate polymerization (NMP), or reverse addition-fragmentation chain transfer polymerization (RAFT) of the respective monomers.

Item 12. The medical adhesive composition of any one of items 1 to 11, the copolymer comprising a linear, comb shape graft (or brush) or branched multiarm architecture.

Item 13. The medical adhesive composition of any one of items 1 to 12, the water-soluble units being present in a range of about 50 to about 95 mole percent, the interfacial adhesive units being present in a range of about 5 to about 50 mole percent, and the crosslinkable units being present in a range of about 0.001 to about 25 mole percent, in each case with respect to the total number of moles of repeating units in the copolymer.

Item 14. The medical adhesive composition of any one of items 1 to 13, the copolymer being a terpolymer.

Item 15. The medical adhesive composition of item 14, the terpolymer being a copolymer of acrylic acid, acrylic acid N-hydroxysuccinimide ester, and N-methacryloyl 3,4-dihydroxy-phenylalanine.

Item 16. The medical adhesive composition of item 15, the terpolymer being a copolymer of acrylic acid (AA), acrylic acid N-hydroxysuccinimide ester (AANHS), and (C) N-methacryloyl 3,4-dihydroxy-phenylalanine (MDOPA), wherein the mole ratio of AA:AANHS:MDOPA is about 70:15:15.

Item 17. The medical adhesive of any one of items 1 to 16, the copolymer being admixed with water to form a water-swollen adhesive.

Item 18. The medical adhesive composition of any one of items 1 to 17, the composition exhibiting shear thinning behavior at (a) a shear rate of greater than 70 s$^{-1}$ at 23° C. or (b) at a shear rate of greater than 30 s$^{-1}$ at 38° C. or (c) both (a) and (b).

Item 19. The medical adhesive composition of any one of items 1 to 18, further comprising a crosslinking agent, the crosslinking agent capable of forming covalent bonds with the crosslinkable units present in the copolymer.

Item 20. The medical adhesive composition of any one of items 1 to 18, the at least one copolymer crosslinked by a crosslinking agent, the crosslinking agent having formed covalent bonds with the crosslinkable units present in the copolymer.

Item 21. The medical adhesive composition of item 19 or 20, the covalent bonds resulting from a maleimide-thiol group reaction, an N-hydroxysuccinimide ester-thiol group reaction, an amine-aldehyde group reaction, or a transglutaminase enzyme-amine group reaction.

Item 22. The medical adhesive composition of any one of items 19 to 21, the crosslinking agent being a molecule having two, three, or four reactive sites per molecule.

Item 23. The medical adhesive composition of item 22, the crosslinking agent being a thiol derivative of ethoxylated glycerol, trimethylol propane, or pentaerythritol, and the covalent bonds resulting from an N-hydroxysuccinimide ester-thiol group reaction.

Item 24. The medical adhesive composition of any one of items 1 to 23, the composition acceptable for human use.

Item 25. A method of preparing a medical adhesive composition, said method comprising copolymerizing a homogeneous mixture of acrylic acid (AA), acrylic acid N-hydroxysuccinimide ester (AANHS), and (C) N-methacryloyl 3,4-dihydroxy-phenylalanine (MDOPA) in a solvent in the present of a free radical initiator to form a solid copolymer.

Item 26. The method of item 25, further comprising separating the solid copolymer from the reaction mixture.

Item 27. The method of item 26, further comprising swelling the solid copolymer with water to form a water-swollen adhesive.

Item 28. The method of item 27, further comprising admixing a thiol-PEG crosslinking agent with the water-swollen adhesive.

Item 29. A medical adhesive composition prepared by the method of any one of items 23 to 28.

Item 30. A kit comprising a sterile package containing a medical adhesive composition of any one of items 1-18 and a crosslinking agent.

Item 31. The kit of item 30, the medical adhesive composition and crosslinking agent adapted and acceptable for human use.

Item 32. A method for attaching two substrates to one another, the method comprising contacting each substrate with a composition of any one of items 1-19 for a time sufficient that the substrates are attached to one another.

Item 33. The method of item 32, further comprising admixing the composition of any one of claims 1-19 with a crosslinking agent.

Item 34. The method of item 33, the composition of any one of items 1-19 and the crosslinking agent being admixed before applying to either of the two substrates.

Item 35. The method of any one of items 32 to 34, at least one of the two substrates comprising a biological tissue surface.

Item 36. The method of any one of items 32 to 35, at least one of the two substrates being a dermal or mucosal tissue surface.

Item 37. The method of any one of items 32 to 36, at least one of the two substrates comprising an internal membrane tissue surface.

Item 38. The method of any one of items 32 to 37, at least one of the two substrates comprising a mammalian tissue surface.

Item 39. The method of any one of items 32 to 38, at least one of the two substrates being a non-biological surface.

EXAMPLES

The following Examples are provided to illustrate some of the concepts described within this disclosure. While each Example is considered to provide specific individual embodiments of composition, methods of preparation and use, none of the Examples should be considered to limit the more general embodiments described herein.

Example 1

Example 1.1

Materials

All chemicals were purchased from Aldrich. Vinyl group containing monomers were filtered through basic alumina-packed glass columns to remove inhibitors. All other chemicals were used as received. MDOPA and AANHS were synthesized and characterized according to known literature procedures (see, e.g., FIG. 1). Porcine skins were purchased from a local grocery store.

Example 1.2

Synthesis of Adhesives

Figure 1C:
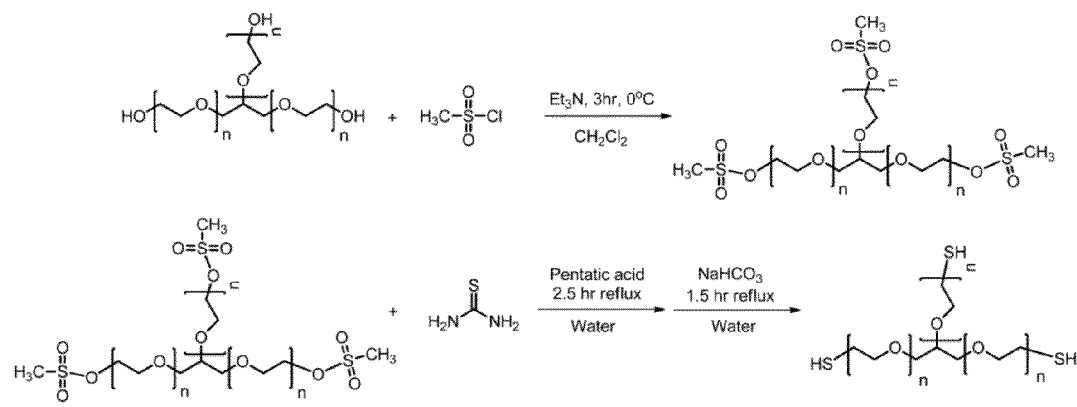
Figure 1D:
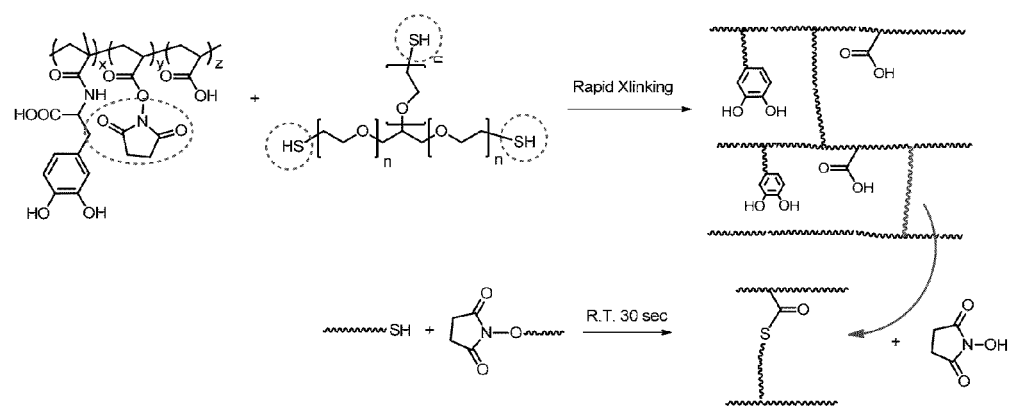
Figure 2A:
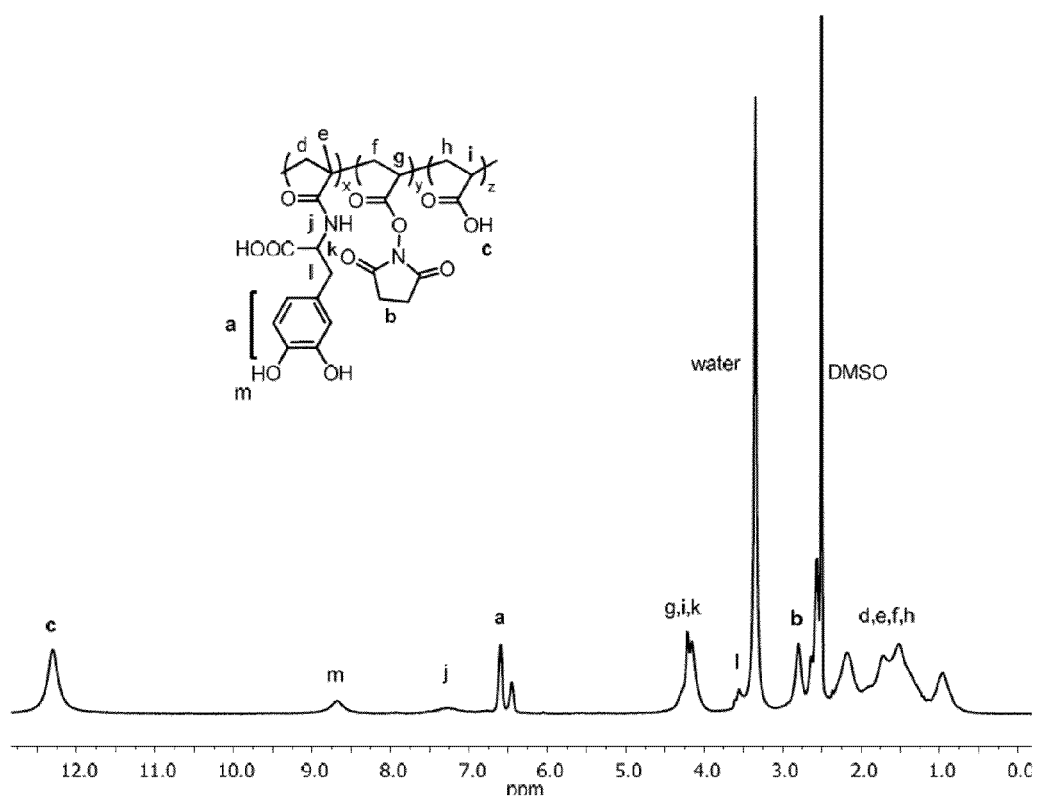
(FIG. 2A); thiolated PEG glycerol crosslinking agent in CDCl$_3$ (FIG. 2B); and of the result of mixing poly(AA-co-AANHS-co-MDOPA) and thiol PEG crosslinker (FIG. 2C spectrum taken in DMSO-$d_6$) In FIG. 2C, the integrated intensity of the peak at 2.8 ppm attributable to —CH$_2$CH$_2$— of the N-hydroxysuccinimide ester (NHS) in the crosslinked product was significantly less than the corresponding integrated intensity of the non-crosslinked product (FIG. 2A), confirming that the crosslinking is between the NHS moiety and the crosslinker.

Poly(AA-co-AANHS-co-MDOPA) was synthesized by azobis(isobutyronitrile) (AIBN)-initiated free radical polymerization of three monomers including AA, AANHS, and MDOPA as shown schematically in FIG. 1. AA (2.624 g), AANHS (1.319 g), MDOPA (2 g), and AIBN (256.3 mg) were mixed in DMF (53 mL). The reaction mixture was degassed with dry argon gas bubbling for 15 min. The homogeneous reaction mixture was placed in a 70° C. oil bath and stirred for 3 hours. After the reaction, the solution was added dropwise diethyl ether (800 mL). A white pulp-like solid precipitated and was recovered by vacuum filtration. The recovered solid was dried and dissolved in methanol (15 mL) and then precipitated once more into diethyl ether (200 mL). The final product was dried under vacuum overnight. The $^1$H NMR spectrum (500 MHz) of poly(AA-co-AANHS-co-MDOPA) is shown in FIG. 2A.

Example 1.3

Synthesis of Cross-Linking Agents

Figure 2B:
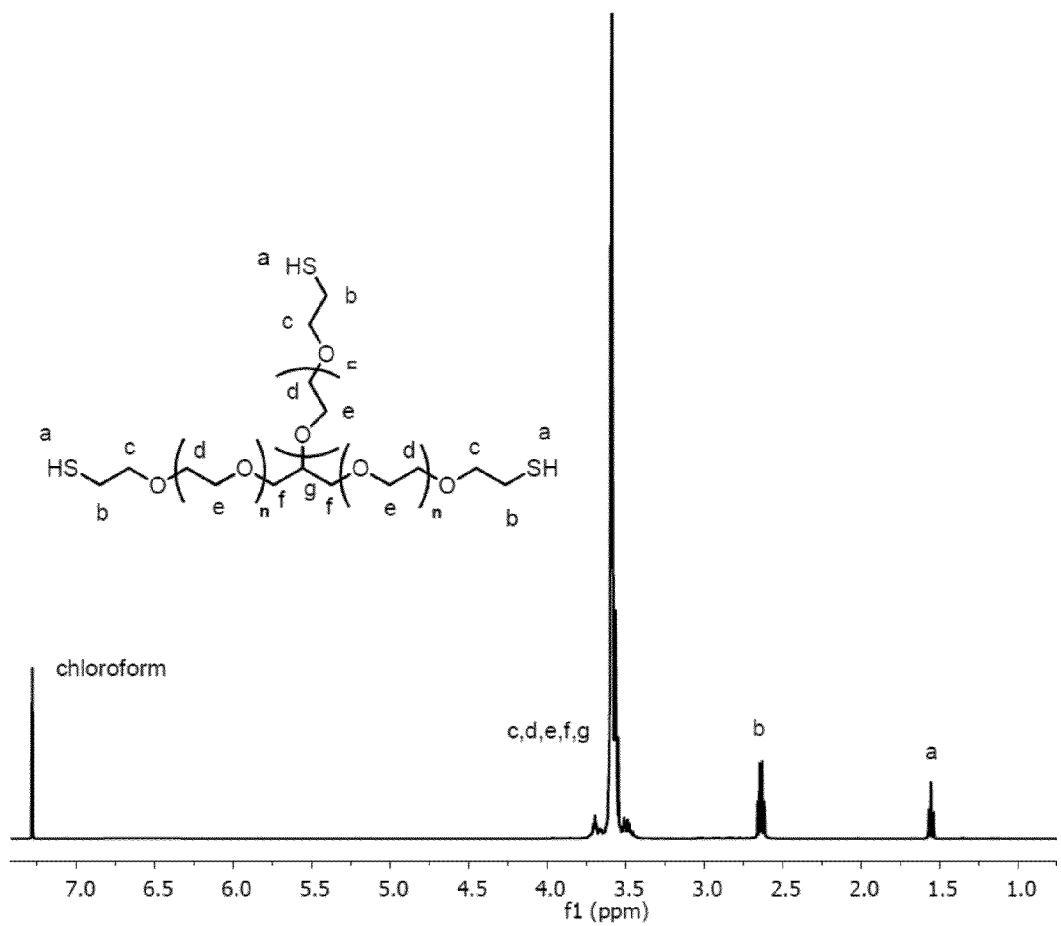
FIG. 2 shows $^1$H NMR spectra of a composition of poly(AA-co-AANHS-co-MDOPA) in DMSO-$d_6$.

Thiol PEG was synthesized and characterized as follows. Briefly, thiolated ethoxylated glycerol was prepared by two steps: the first step is synthesis of mesylate terminated ethoxylated glycerol, and the second step is synthesis of thiol end groups (it should be apparent that other polyols may be substituted for the glycerol in this synthetic scheme). To prepare mesylate-terminated ethoxylated glycerol (aka 3-armed PEG), glycerol ethoxylate (5 g) and triethylamine (3 g) were dissolved in methylene chloride (70 mL). Separately, mesyl chloride (6.87 g) was dissolved in methylene chloride (30 mL). The two separated solutions were mixed slowly together while keeping the temperature at 0° C. in an ice bath. White fumes were observed during the mixing process. The reaction mixture was stirred for 3 hours at 0° C. After stirring, all solvents were removed by a rotary evaporator. The resulting viscous liquid was dissolved in water, and then NaHCO$_3$ was slowly added to neutralize the remaining mesyl chloride. Saturated NaHCO$_3$ can also be used instead of dry NaHCO$_3$ powder. The product was extracted with chloroform (60 mL×3) and then dried over MgSO$_4$. The final product, mesylate-terminated 3-armed PEG, was obtained after removal of all chloroform by rotary evaporation. Mesylate-terminated 3-armed PEG (7 g), diethylenetriaminepentaacetic acid (50 mg), and thiourea (3.2 g) were mixed in water (100 mL). The solution's pH was adjusted to 6.7 with KOH aqueous solution and refluxed for 2.5 h. After cooling the solution, 1.5 equivalents of NaHCO$_3$ (2.65 g) was added to hydrolyze the isothiouronium salt. The solution was refluxed again for 1.5 h and cooled, and then aqueous sulfuric acid (1 M) was slowly added to the solution until the solution was neutralized. The final product was extracted with chloroform (50 mL×3) and then dried over MgSO$_4$, and the solvent was removed using a rotary evaporator. The light brown and viscous final product was stored in the cold (−18° C.) and in the dark. The overall reaction scheme is presented in FIG. 1C, and the $^1$H NMR spectra of the products are shown in FIG. 2B.

Example 1.4

Synthesis of Poly(AA-co-AANHS-co-MDOPA) and Thiol PEG

Figure 2C:
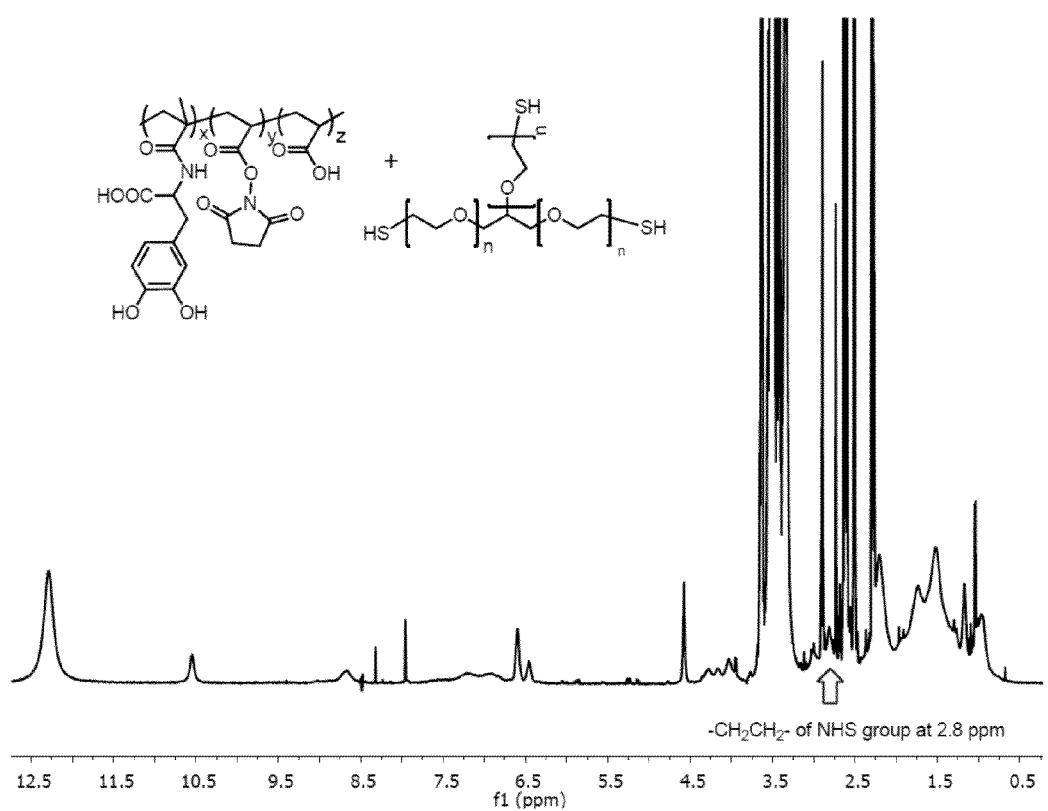

Poly(AA-co-AANHS-co-MDOPA) was synthesized by a thermally initiated free radical polymerization of AA, AANHS, and MDOPA as shown in FIG. 1. The prepared polymer was characterized by $^1$H NMR to calculate ratios of each repeating unit in the final poly(AA-co-AANHS-co-MDOPA). $^1$H NMR and chemical structure assignments are shown in FIG. 2C. After testing, samples which were prepared with various ratios of three repeating units, a terpolymer which has 70% of AA, 15% of AANHS, and 15% of MDOPA, demonstrated the most suitable properties for use as an adhesive. Therefore, these Examples on an adhesive of this composition. According to $^1$H NMR characterization, the final composition reflected the initial feeds of monomers.

The polyAA provides a water-soluble functionality that also an FDA-approved nontoxic food additive. The ionic interaction of polyAA generates much stronger hydrophilicity than commonly used PEG-water interactions. MDOPA functions as a strong interfacial adhesive. AANHS units forms covalent bonds to thiol groups at cross-linkers. The reaction is illustrated in FIG. 1D. In this cross-linking chemistry, NHS reacts very rapidly with thiol groups and forms covalent bond at thio-ester groups with release of N-hydroxysuccinimide. Cross-linking agent, thiol PEG, was functionalized with glycerol ethoxylate which is a 3-armed poly(ethylene glycol). Poly(ethylene glycol) is commonly used in biomaterials due to its biocompatibility, hydrophilicity, and nontoxicity. The starting material, glycerol ethoxylate, has an average Mw of 1000 g/mol, and the number of ethylene oxide repeating unit is 6-7 for each arm according to the manufacturer's information (Aldrich). The chemical structure was confirmed by $^1$H NMR characterization. The viscosity of the selected glycerol ethoxylate was sufficiently low to allow effective mixing with the adhesives. The molecular weight of glycerol ethoxylate (Mw≈1000 g/mol) can prevent or retard the possible absorption of surplus cross-linking agents in the cell/tissue after the reaction is complete. The multiple armed poly(ethylene glycol) architecture was selected to increase the reactivity for more effective cross-linking with adhesives. Thiol terminal functional groups were introduced in two steps as shown in FIG. 1C. First, hydroxyl groups were converted to mesyl groups via substitution reactions with methanesulfonyl chloride. Second, a thiol group was introduced to PEG arm terminals after reaction of mesyl group and thiourea.

Example 1.5

Adhesion Property Test (Lap Shear Strength Test)

Figure 6:
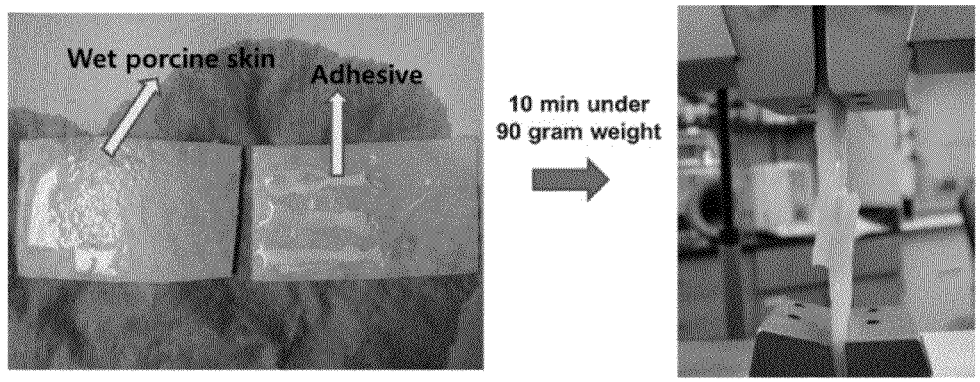
FIG. 6 provides images of lap shear strength test set-up; adhesives (white lines on porcine skin) was applied to wet porcine skin prior to being sandwiched and compressed under 90 grams of weight for 10 minutes. See Example 1.7.

Adhesion properties were determined by lap shear strength tests. Porcine skin was selected due to its biological similarity to human dermis. Approximately 3 mm thick porcine skins were cut and trimmed into 5 cm×2.5 cm size. The prepared porcine skin was used as an adherend without further purification or modification in order to mimic real clinical condition. Adhesives were preweighed (100 mg) and swollen in a syringe (1 mL) with a water prior to use. Water was sprayed on porcine skin, and then water-swollen adhesives were aligned on wet porcine skin with three straight lines. Another porcine skin was overlaid on the adhesive applied part and quickly rubbed several times. The overlaid porcine skins with adhesives were compressed under 90 g of weight for 10 min. For crosslinked adhesive test, a cross-linker (100 µL) was applied between the adhesive lines on porcine skin so as not to mix adhesive and crosslinker before the test. Exactly the same test sample preparation procedure was used for SUPER GLUE™ (the original SUPER GLUE, Rancho Cucamonga, Calif.) adhesion property tests. The porcine skin was thoroughly wet by water before addition of the adhesive (FIG. 6.) Shear strength was measured at room temperature (23° C.) with an Instron testing machine (model E3000 and model 5569). Load was recorded as a function of displacement with a cross-head speed of 1 cm/min. The maximum load (force) was divided by the overlapping contact area of porcine skins to calculate adhesion strength. Tests were performed at least five times for each type of adhesive, and data points were averaged. In order to test covalent bond formation between cross-linker and adhesive, three different amounts of cross-linker—50, 100, and 200 mg—were mixed with 100 mg of adhesives. The water-swollen adhesive was mixed with a designated amount of cross-linker and then frozen in dry ice. The frozen mixture was lyophilized for 24 h to remove water. The dry product was dissolved in DMSO-$d_6$ to quantify the reacted functional groups. In the $^1$H NMR, peak integrations at 2.8 ppm were compared to calculate the consumed NHS group since the signal at 2.8 ppm indicates a —CH$_2$CH$_2$— at AANHS units in terpolymer. The $^1$H NMR spectrum of adhesive and cross-linker mixture is shown in FIG. 2C.

Example 1.6

Viscoelastic Property Analysis

Viscoelastic properties were characterized by a rheometer (TA Instruments, Model AR1000) equipped with 25 mm diameter stainless steel parallel plate geometry. Adhesive samples (200 mg) were swollen in water prior to testing. Steady state shear viscosity was recorded as a function of shear rate (s$^{-1}$) from 1000 to 0.1 s$^{-1}$ at 23° C. and 38° C. For dynamic mechanical analysis, frequency sweeps from 100 to 0.1 Hz were conducted to measure elastic modulus (G') and viscous modulus (G") at 23 and 38° C.

Example 1.7

Adhesion Property Characterization of Non-Crosslinked and Crosslinked Adhesives

Figure 3:
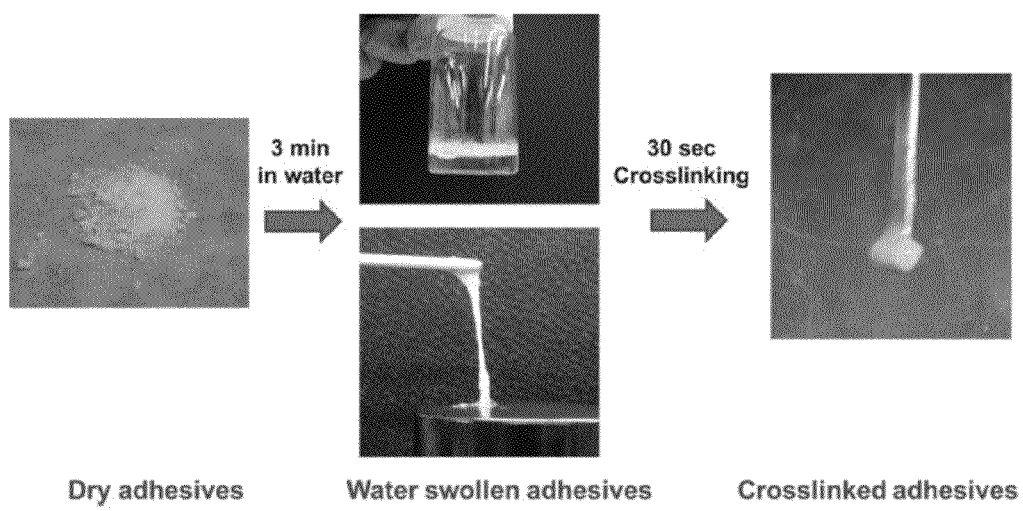
FIG. 3 illustrates the property changes of the adhesives in water and after crosslinking. The dry adhesive powder (left) becomes swollen on addition of water (middle) to become a viscous liquid in about 3 minutes. The liquid swollen adhesive becomes a solid gel after crosslinking with the thiolated PEG glycerol (right). See Example 1.7.

The final state of the prepared adhesive is a white powder as shown in the first image of FIG. 3. The dry powder is not an adhesive. But as soon as the powder was mixed with water, the adhesive became a very soft, viscous liquid as shown in the second image of FIG. 3. The adhesive absorbed 2.5 times of its weight of water and did not dissolve in water homogeneously even after a long exposure time. Hydrogen bonding between the amide functionality at MDOPA and interaction between highly charged side chains contribute to strong aggregations and chain entanglement to limit solubility in water. The water-swollen adhesive was mechanically mixed with thiol PEG to yield a crosslinked solid. The crosslinked adhesive was a flexible solid material as shown in the right-most images of FIG. 3. The mixture of adhesive and cross-linker was analyzed by $^1$H NMR as shown in FIG. 2C. The 2.8 ppm signal from the —CH$_2$CH$_2$— groups in the AANHS units in the adhesive showed a significant decrease of integration compared to unreacted terpolymers. The NMR clearly demonstrates that a large amount of NHS was consumed after reaction with thiol groups of the cross-linker. The adhesive utilize the DOPA moieties for interfacial adhesion not for cross-linking. The presented cross-linking system occurred very rapidly within 30 sec. In contrast to previously reported DOPA-thiol Michael addition which took at least 6 hours at 37° C. until the completion of the reactions, the final rheological property results also support that there is no significant DOPA-thiol Michael reaction occurred during the testing time. According to the steady state shear viscosity test and dynamic mechanical analysis results (FIG. 4 and FIG. 5), the crosslinked adhesives did not show significant viscosity change or moduli change during the test. More detailed rheological analyses are discussed further below. Adhesion properties were evaluated by using lap shear strength test with an Instron (Model E3000 and model 5569).

Porcine skin was used as an adherend to test the prepared adhesive's possible biomedical applications. Porcine skin is commonly used for various biomedical experiments due to its biological similarity to human dermis. The porcine skin substrate was wet with purified deionized water (DI water) prior to adhesive application in order to test the wet adhesion property of adhesives. A typical adhesion test set up is demonstrated in FIG. 6. The white lines on the porcine skin are adhesives in the left image of FIG. 6. For the crosslinked adhesive test, adhesive and cross-linkers were aligned parallel and then the porcine skins were overlaid. The overlaid porcine skin was quickly rubbed several times prior to weight compression. All overlaid substrates were compressed by 90 g of weight for 10 min, which is a much shorter time than other reports for DOPA-containing biomedical adhesives.

Figure 7:
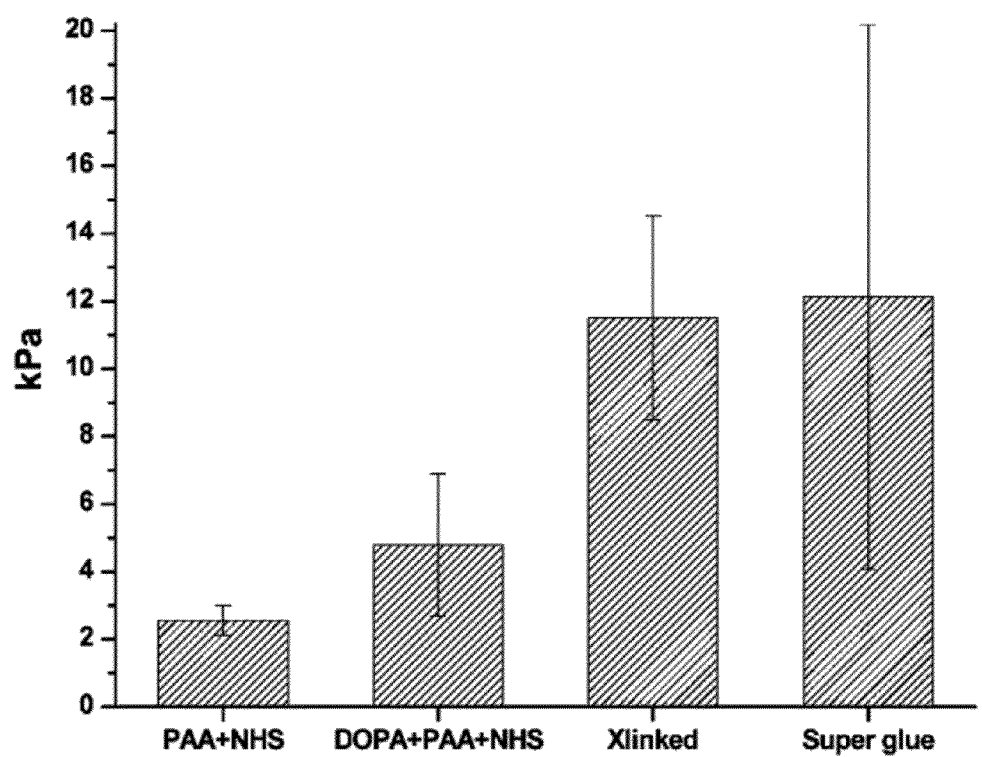
FIG. 7 illustrates the relative adhesive properties of the adhesives as provided in Example 1.7 and Super Glue™; measurements of lap shear strength of the adhesives were obtained by dividing the recorded maximum load (force) by the overlapped porcine surface area.
Figure 8A:
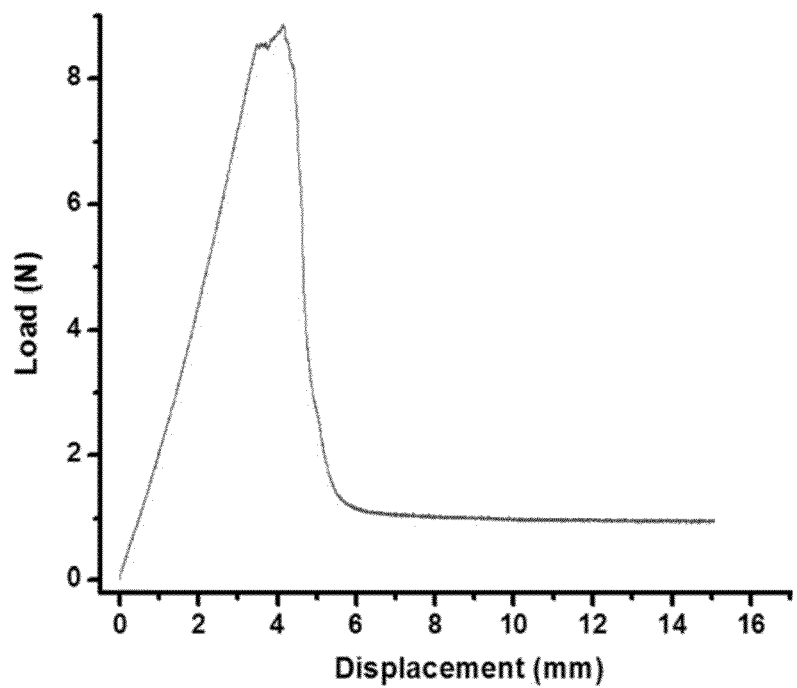
FIG. 8 show data from experiments described in Example 1.7 for load vs. displacement of the crosslinked adhesive (FIG. 8A) show much sharper failure of load than those of non-crosslinked adhesive (FIG. 8B).
Figure 8B:
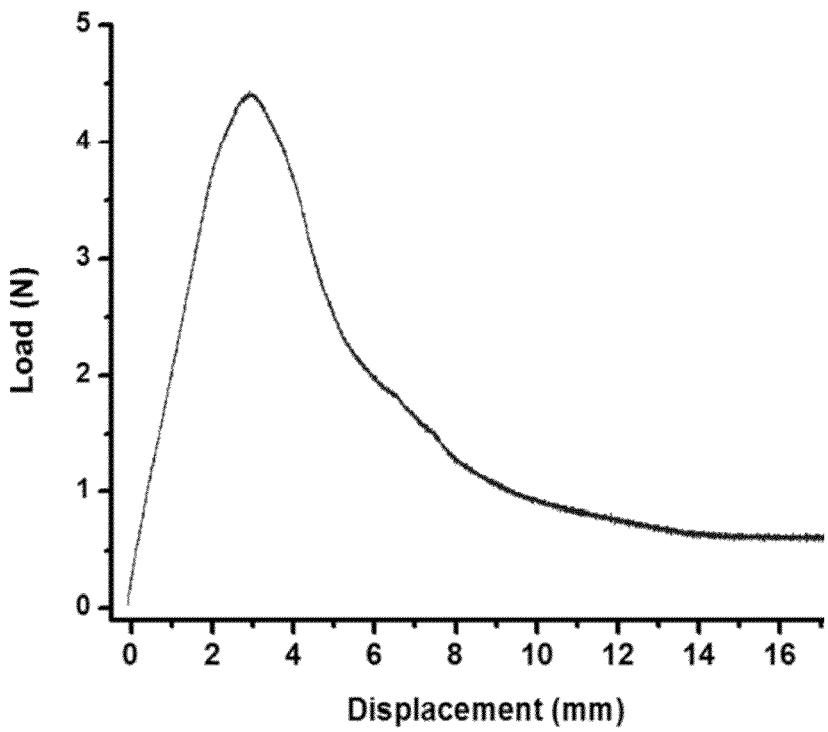

To confirm the enhanced adhesion property with DOPA moiety in an adhesive chemical structure, poly(AA-co-AANHS) was prepared and tested. Poly(AA-co-AANHS) was synthesized by exactly the same method as poly(AA-co-AANHS-co-MDOPA), except for the MDOPA monomer. As shown in FIG. 7, poly(AA-co-AANHS) demonstrated very low adhesion strength, 2.5 kPa on average. The terpolymer containing DOPA moiety, poly(AA-co-AANHS-co-MDOPA), presents much higher adhesion strength of 4.8 kPa, which is 190% over the value of adhesive without a DOPA moiety, poly(AA-co-AANHS). The highest adhesion strength was obtained from a crosslinked adhesive mixture of poly(AA-co-AANHS-co-MDOPA) and thiol PEG. As shown in FIG. 7, this mixture of adhesive, poly(AA-co-AANHS-co-MDOPA), and cross-linker, thiol PEG, is demonstrated to be crosslinked. The crosslinked adhesive showed a 450% increased adhesion strength compared to poly(AA-co-AANHS) under the given test conditions (cross-head speed of 10 mm/min) This adhesion strength was similar to commercially available Super Glue™ (cyanoacrylate). The standard deviation of Super Glue adhesion tests result was very large; in other words, Super Glue™'s adhesion property is undependable in wet condition on porcine skins. The force-displacement curve clearly shows differences of adhesive failure process before and after crosslinking (FIG. 8) in terms of maximum force and failure pattern. Non-crosslinked adhesive shows a gradual decrease of load after it reaches the maximum strength and forms numerous adhesive fibers between adherends. Crosslinked adhesive demonstrates much higher maximum strength and sudden failure of adhesion without forming fibers between adherends. This phenomenon demonstrates that covalent cross-links were formed between adhesive polymer chains, and accordingly the cross-linking enhances the maximum adhesion strength by increasing cohesive strength in adhesive structures.

Example 1.8

Viscoelastic Properties of Non-Crosslinked and Crosslinked Adhesives

Figure 4A:
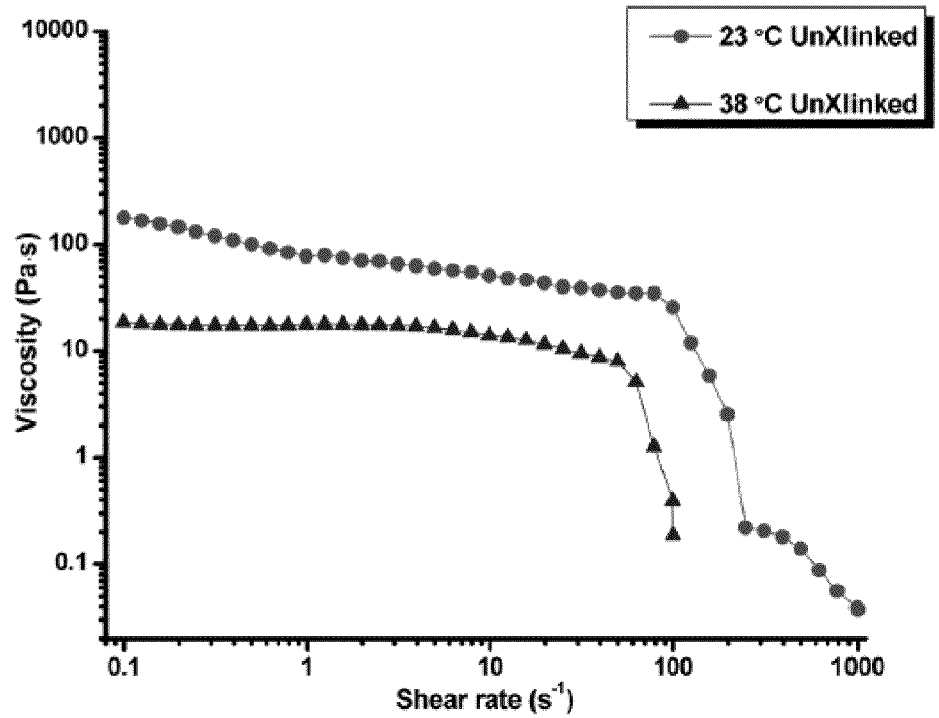
FIG. 4 illustrate the effect of shear on viscosity for non-crosslinked (FIG. 4A) and crosslinked (FIG. 4B) adhesives at ambient room temperature (23° C.) and human body temperature (38° C.), as described in Example 1.8.
Figure 4B:
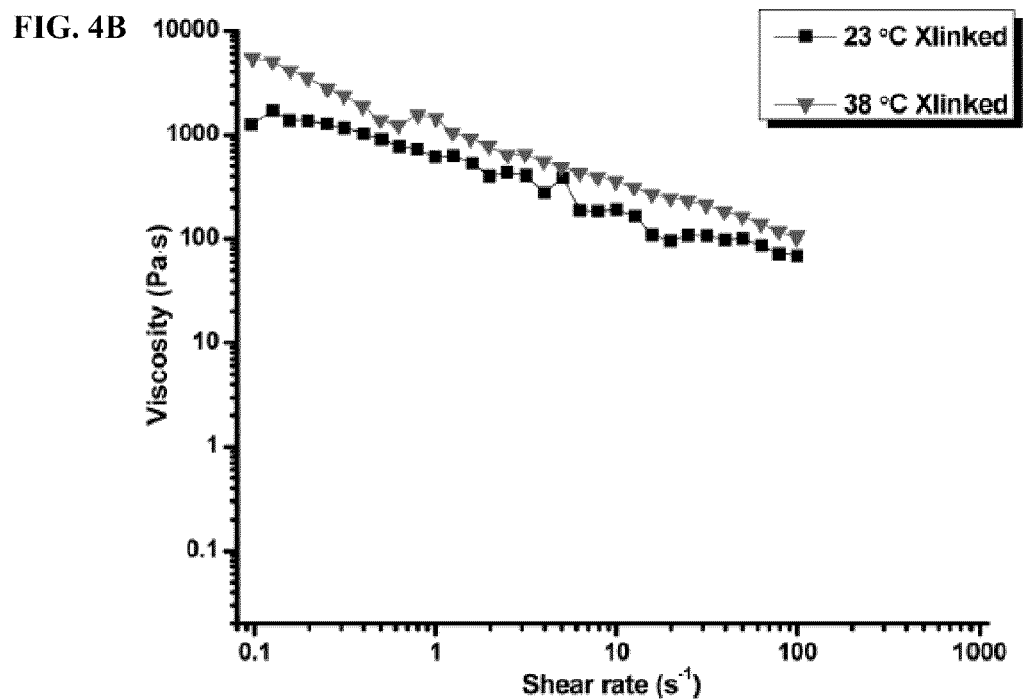
Figure 5A:
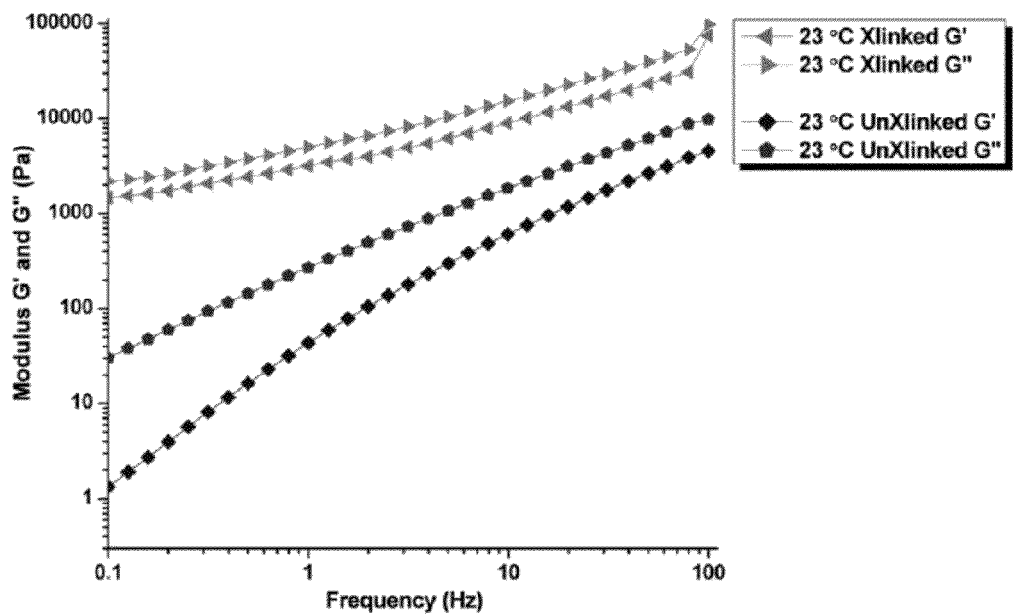
FIG. 5 shows the storage modulus (G') and loss modulus (G") as a function of frequency for crosslinked and non-crosslinked adhesives at ambient room temperature (23° C.) (FIG. 5A) and human body temperature (38° C.) (FIG. 5B), as described in Example 1.8; the measurements were performed at constant strain of 5%.
Figure 5B:
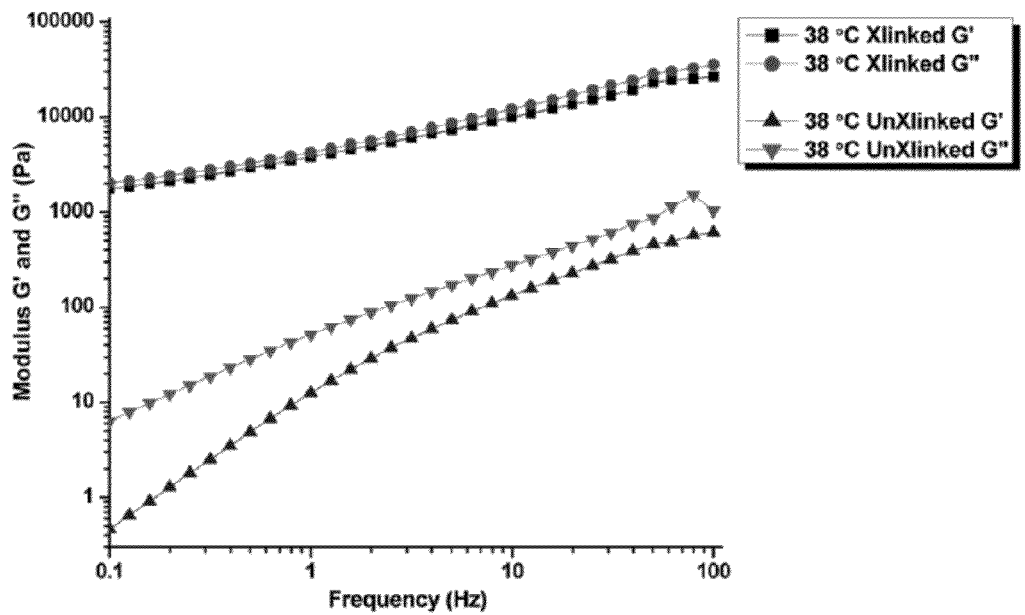

Steady-state shear viscosity tests and dynamic mechanical analysis were carried out to characterize the viscoelastic properties of non-crosslinked (poly(AA-co-AANHS-co-MDOPA)) and crosslinked (mixture of poly(AAco-AANHS-co-MDOPA) and the thiol PEG) adhesives. The viscoelastic properties were examined at room temperature (23° C.) and human body temperature (38° C.) to determine if the polymer could be a biomedical adhesive. FIG. 4 shows steady-state shear viscosity as a function of shear rate ($s^{-1}$). Interestingly, non-crosslinked adhesive revealed a significant drop of viscosity near 100 $s^{-1}$ (FIG. 4A). This is a typical behavior of a shear thinning polymer because the entanglement density of polymer chains decreases with increasing shear rate. This character is useful in biomedical adhesives which are delivered by syringe-needle injection due to significant increase of shear rate the adhesive polymers experience when it enters the narrow needle from a relatively large syringe body. The shear thinning effect could help easy injection of the adhesive material without severe back-pressure. At 38° C. in FIG. 4A, non-crosslinked adhesive showed a sudden drop of viscosity at lower shear rate. At both 23 and 38° C., non-crosslinked adhesive showed very stable viscosity before a shear rate of 100 $s^{-1}$. The crosslinked adhesive showed much higher viscosity over a range between 0.1 and 100 $s^{-1}$ than the non-crosslinked adhesive at both 23 and 38° C. (FIG. 4B). This viscosity result from the crosslinked adhesive test in FIG. 4B shows that once the adhesive is fixed to the area of interest, it demonstrates stable and strong viscoelastic properties. Both elastic and viscous moduli, G' and G", are shown in log-log scale as a function of frequency (Hertz) in FIG. 5. All crosslinked adhesives demonstrated a much higher moduli than non-crosslinked adhesives as shown in FIG. 5A/B. Also, the elastic and viscous moduli of crosslinked adhesives were closer than non-crosslinked adhesives over all tested frequency range (FIGS. 5A and 5B). These results suggest that the non-crosslinked adhesive is more similar to a viscoelastic liquid, while crosslinked adhesive is closer to a viscoelastic solid. No significant gel point was observed in both FIGS. 5A and 5B due to the adhesives' strong viscoelastic liquid behavior in all the tests. In other words, the crosslinked adhesive is not an absolute solid from a rheological point of view, but the crosslinked adhesive is closer to a solid than a liquid. The shown rheology data are consistent with visual observation of the crosslinked adhesive material. While temperature effects on the crosslinked adhesives were not significant, non-crosslinked adhesives demonstrated a strong temperature effect on its viscoelastic behavior as shown in FIG. 5C. At 38° C., much lower moduli was observed for non-crosslinked adhesive, and moduli responded more significantly with changes of frequency. Overall, the prepared adhesive strengthens by cross-linking, and the crosslinked adhesive presents high stability under various temperatures while showing viscoelastic solid characters.

In summary, this example describes a new three-component bio-inspired adhesive was synthesized that is a terpolymer composed of water-soluble units, interfacial adhesion units, and cross-linking units, and the results obtained from its testing. Strong wet adhesion properties are obtained utilizing a 3,4-dihydroxy-L-phenylalanine (DOPA) moiety. Poly(acrylic acid) provides high water solubility due to strong ionic interactions with water. An acrylic acid N-hydroxysuccinimide ester (NHS) was included in the adhesive polymer to allow rapid cross-linking with thiolterminated, 3-armed poly (ethylene glycol) cross-linking agents. The thiol terminal ethoxylated glycerol was designed to be bulky to avoid possible penetration of molecules to the cell and tissue. The NHS and thiol groups reacted within 30 second to form covalent bonds. This design allows for rapid optimization of properties for specific applications. Lap shear strength tests on wet porcine skin demonstrated a 190% increased value in adhesion strength for adhesives having the DOPA moiety. After cross-linking, adhesion was enhanced by 450% over poly (acrylic acid-co-acrylic acid NHS) and was 240% higher than non-crosslinked poly(acrylic acid-coacrylic acid NHS-co-N-methacryloyl-3,4-dihydroxyl-L-phenylalanine). Rheology studies showed adhesive viscosity drops significantly at high shear rates, demonstrating its potential to be injected via syringe. The crosslinked adhesive displayed much stronger mechanical properties and higher elastic and viscous moduli than an non-crosslinked adhesive model. Furthermore, the crosslinked adhesive exhibited enhanced moduli near body temperature (38° C.) as compared to room temperature (23° C.), increasing the applications as a biomedical adhesive.

Example 2

As discussed above, the inventive compositions are also shown to operate in tissue membrane applications. The following Examples describe an exemplar of such an application—i.e., in preventing Preterm Premature Rupture of Membranes (PPROM). As shown below, the copolymer, poly (acrylic acid-co-acrylic acid N-hydroxysuccinimide ester-co-N-methacryloyl 3,4-dihydroxyl-L-phenylalanine) (poly (AA-co-AANHS-co-MDOPA) was tested on human fetal membrane under increased internal pressure as an effective method to prevent Preterm Premature Rupture of Membranes (PPROM).

Potential sequelae of PPROM is highly related to fetal, maternal and neonatal risk such as preterm delivery, fetomaternalsepsis, limbdeformities, fetal demise, oligohydramnios-related pulmonary hypoplasia and chorioamnionitis, respiratory distress syndrome, cerebral palsy, blindness deafness, kernicterus, necrotizing enterocolitis. The risk of PPROM increases as the diameter of the instrument used to puncture the fetal membrane increases. Preventive presealing of the membrane prior to instrument puncture may be an effective way to avoid fetal membrane rupture. In this example, the performance of a composition of the present invention will be compared against two commercially available bio-medical adhesives (Indermil™ and BioGlue™).

Example 2.1

Materials

All chemicals were purchased from Aldrich and used as received otherwise specifically mentioned. Liquid monomers were filtered through a glass columns packed with basic alumina to remove inhibitors. Monomer, MDOPA, and the terpolymer were synthesized and characterized as described above. (FIG. 1). Ballistics gel power was purchased from Vyse Gelatin Company. BioGlue™ was purchased from Cyrolife. Indermil™ was purchased from Synetur.

Placentas were collected from University of California, San Francisco Hospital after appropriate institutional review and approval. The collected placentas originated from mothers who gave birth in the third trimester of pregnancy and showed negative testing in hepatitis B/C and human immunodeficiency virus. Membrane test sections free from tears, chorioamniotic separation and meconium staining, were selected and excised from placentas. The prepared fetal membranes were stored in a refrigerator (4° C.). The storage period did not exceed 2 days to avoid natural degradation.

Example 2.2

Synthesis of the Sealants

Theterpolymer of poly(AA-co-AANHS-co-MDOPA) were prepared as described above in Examples 1.2 to 1.4.

Example 2.3

Artificial Uterus Specifications

The amniotic sac is composed of a set of two membranes, the amnion—inner membrane—and chorion—outer membrane. The chorion is connected to the maternal fetal tissue and muscles. Amniotic fluid is filled in the amniotic sac. The amniotic fluid and sac protects the fetus by giving a space to the fetus to move and absorbing pressure from the outside. Because of the important role of the amniotic fluid/sac/uterus system has on the protection of the fetus, it was necessary to design and manufacture a realistic model of this system for in vitro study.

Figure 9:
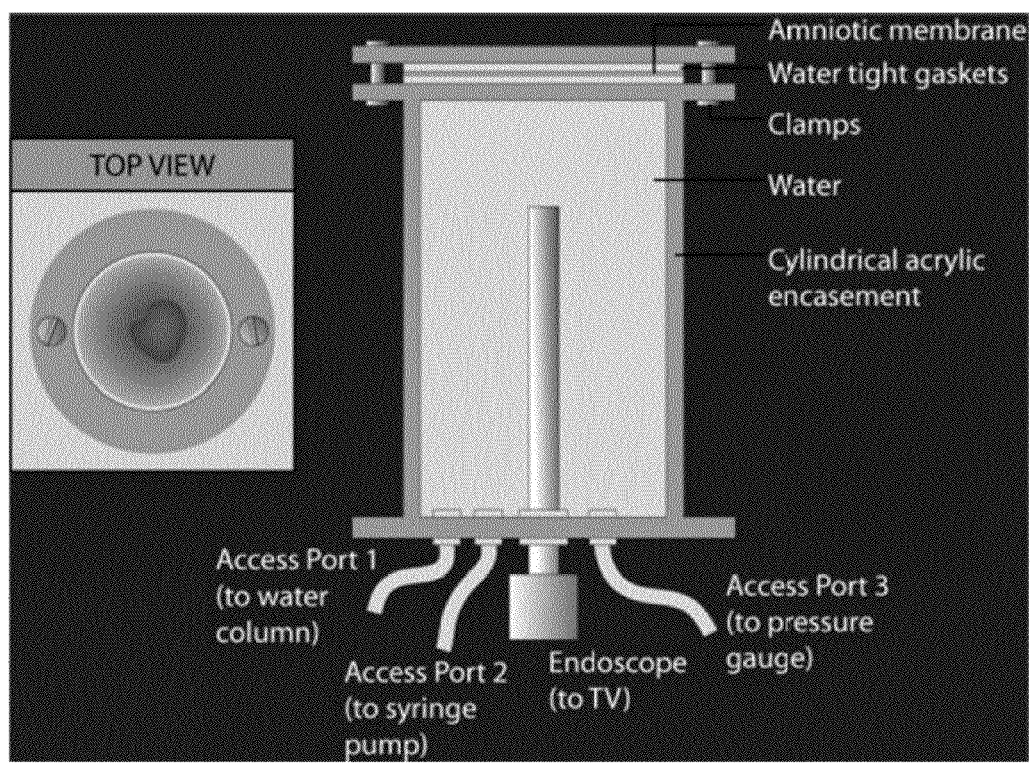
FIG. 9 is a schematic representation of an artificial uterus for in vitro fetal membrane experiments (see Example 2.3).
Figure 10A:
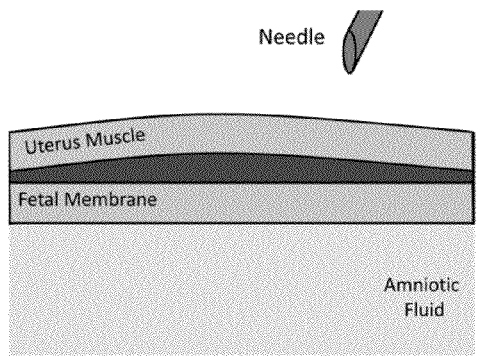
(FIG. 10A) Injectable sealant is brought near to the uterus and fetal membrane.
Figure 10B:
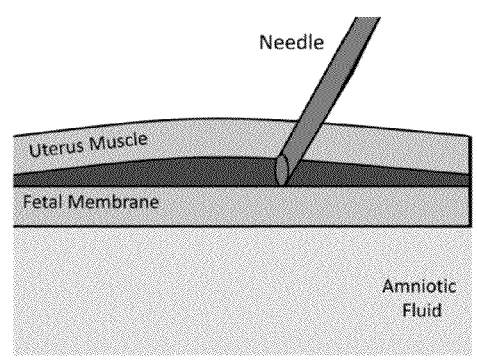
(FIG. 10B) Needle containing sealant is pushed into the interface between the uterus muscle and the fetal membrane.
Figure 10C:
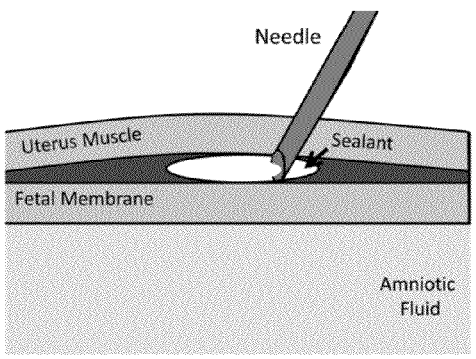
(FIG. 10C) Sealant is injected.
Figure 10D:
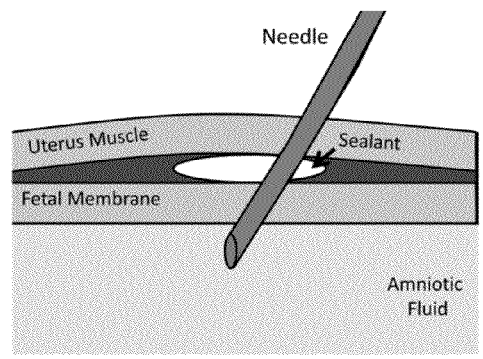
(FIG. 10D) Medical device is introduced through the uterus muscle, sealant and membrane.
Figure 10E:
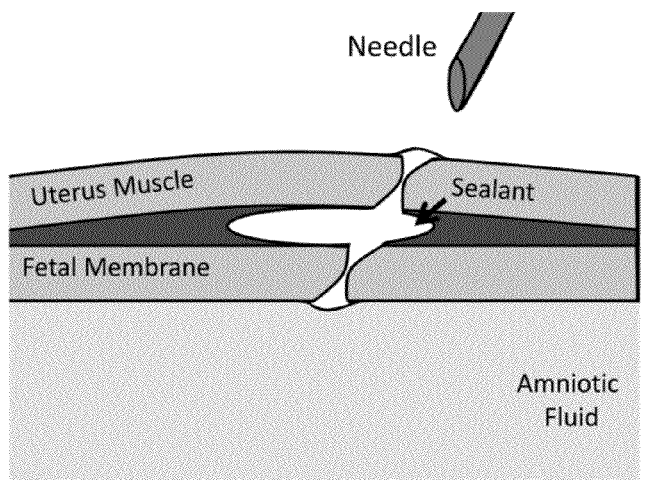
(FIG. 10E) The device is removed and the sealant prevents the amniotic fluid from leaking. See Example 2.5.

An artificial uterus was designed to mimic the natural human uterus and also designed to conduct accurate in vitro experiments which related to fetal membranes. FIG. 9 shows a schematic drawing of the designed artificial uterus. The entire device has a 6" outer diameter and is 8" tall. Internal dimensions of the artificial uterus were 3.25" diameter by 7" tall. The total amount of fluid in the artificial uterus (calculated from the internal dimensions) was 116 cubic inches (1.9 liters). The entire artificial uterus was made out of ¼" thick acrylic.

The fetal membrane was installed on the top of the device. The installed fetal membrane was tightly attached to the body of artificial uterus by using rubber gasket. Because the plastic body of artificial uterus was filled with water, the assembled fetal membrane and related parts needed to be completely liquid-tight. Ballistics gel was placed on fetal membrane to simulate uterus muscle for the real experiment. The ballistics gel was supported with a short-column shape guide but allowed to float on top of the membrane.

The bottom of the artificial uterus has many ports for various functions. First, water can be filled or removed to the artificial uterus through the port 1. Access port 2 in FIG. 9 was connected to the syringe to increase the internal pressure of artificial uterus with intended rate or hold the pressure for a certain time. Port 3 was coned to pressure gage which filled with water. The pressure gage was calibrated with commercial manometer prior to actual experiments. The bottom center of artificial uterus had a real endoscope to monitor any change. The endoscope camera faced to the inside of fetal membrane. The whole body of artificial uterus was made of stiff commercial acrylic polymer, so it was safe in a given maximum pressure below 100 mmHg. Because of the hardness of the body material, internal pressure changes can be applied to the installed fetal membranes only. Therefore, all of tests and observation is focused on fetal membrane installed top portion of the artificial uterus.

Example 2.4

Preparation of Ballistics Gel

Ballistics gel powder was purchased from Vyse Gelatin Company as a "professional grade ballistic and ordnance gelatin". First, 100 grams of gelatin power was weighed out and placed in a zip lock bag. Warm water (200 grams) was added to the bag and mixed thoroughly. All air was eliminated during the mixing to avoid any air bubbles in the finally produced gel matrix. The mixture became a stiff solid in 10 minutes. The formed solid was broken into small pieces and mixed again with additional boiling water (700 mg). The new mixture was stirred for 30 seconds and then stirred repeatedly every 5-10 minutes until it cooled. After cooling the mixture, it was poured slowly into a mold and placed in the refrigerator overnight to set. The finally solidified ballistics gel contains 10% of original gel power and 90% of water. The produced ballistics gel demonstrates a density and mechanical property similar to human tissue. The ballistics gel was produced in a long column shape and then precut for the experiment as a 4 cm thickness disk shape.

Example 2.5

Test Methods of Fetal Membrane Sealing Capability

All output ports at the bottom of the artificial uterus were turned to the closed position with the exception of the fill port. The artificial uterus was completely filled with warm (38° C.) water and the fill port was closed off. Methylene blue die was added to the water to aid in identifying a leak. The excised amniotic membrane (insuring both the amnion and chorion are attached and the amnion was facing the inside of the artificial uterus) completely covered the opening in the artificial uterus with at least a 1" buffer on all sides. When placing the membrane it is critical to ensure there are no air bubbles in the fluid chamber. The amniotic membrane was sealed with rubber gaskets to the artificial uterus to ensure a sealed assembly. The sealing was secured with binder clips. Finally, the ballistics gel guide was installed followed by placing the ballistics gel on the top of the amniotic membrane to simulate the uterine wall.

In order to conduct sealing capability measurement, sealants (0.3 gram) were placed between the amniotic membrane and ballistics gel. Note that enough water was applied on the fetal membrane to simulate a real wet condition of fetal membrane in the mother. An initial pressure of 5 mmHg was maintained to simulate ordinary pressure inside the amniotic membrane. The ballistics gel, sealant and amniotic membrane were pierced with the needle and then the needle was removed after one minute. Water pressure was increased slowly (10 mmHg/min) using another port of artificial uterus to control system pressure. While the pressure was increased, amniotic membrane and ballistics gel was carefully observed to check for any leak. Pressure increase was stopped at 50 mmHg unless there is no leakage. This is because non-punctured amniotic membrane busted and/or leaked near 50 mmHg (See FIG. 12) When the pressure reached to 50 mmHg, the water pressure held for another minute before the end of the experiment.

Presealing is a different concept than repair concept, which means a reattachment of punctured or ruptured fetal membrane after the damage happened. In the presealing, the sealant material is placed between the uterus muscle and the fetal membrane prior to any medical procedure, such as fetoscopic surgery and amnioncentesis. Then the needle or fetoscope can be advanced through the uterus muscle, sealant and fetal membrane for the desired treatment. After removal of needle or fetoscope, the sealant will seal any physical damage on fetal membrane and uterus muscles. FIG. 10 illustrates a fundamental idea of the presealant on the fetal membrane. This may be analogized to a magician's balloon which does not burst even after needle puncture due to presealed scotch tape on the balloon.

In the presealing concept, the choice of sealant is very important. The sealant must have strong sealing/adhesion capability with little or no toxicity. Also, the sealant must remain uncured during the medical treatment, at least until the needle or fetoscope is completely removed from the patient's body. For this latter reason, BioGlue™ was found not to be a suitable candidate of presealant in spite of its strong sealing capability (see, e.g., FIG. 12). BioGlue™ cured very quickly, thus the needle or fetoscope would permanently stick to the sealant during the medical treatment.

By contrast, the poly(AA-co-AANHS-co-MDOPA) copolymer was found to be suitable as a fetal membrane presealant to prevent PPROM, exhibiting several attractive attributes. First, the (poly(AA-co-AANHS-co-MDOPA)) copolymer exhibited suitable shear characteristics to be injectable by syringes and needles. While the original state of poly(AA-co-AANHS-co-MDOPA) was white solid powder, the hydrated sealant powder became injectable soft gel after 3 minutes of water swelling. Second, the new sealant was found to maintain its softness during the medical treatment before removal of needle/fetoscope. So there was no danger of permanent adhesion between needle/fetoscope and fetal membrane/uterus muscle while the fetoscopic surgery or other medical treatment was being done. Moreover, the new sealant could be cured by mixing of non-toxic polyethylene glycol based crosslinker depending on necessity.

Figure 12:
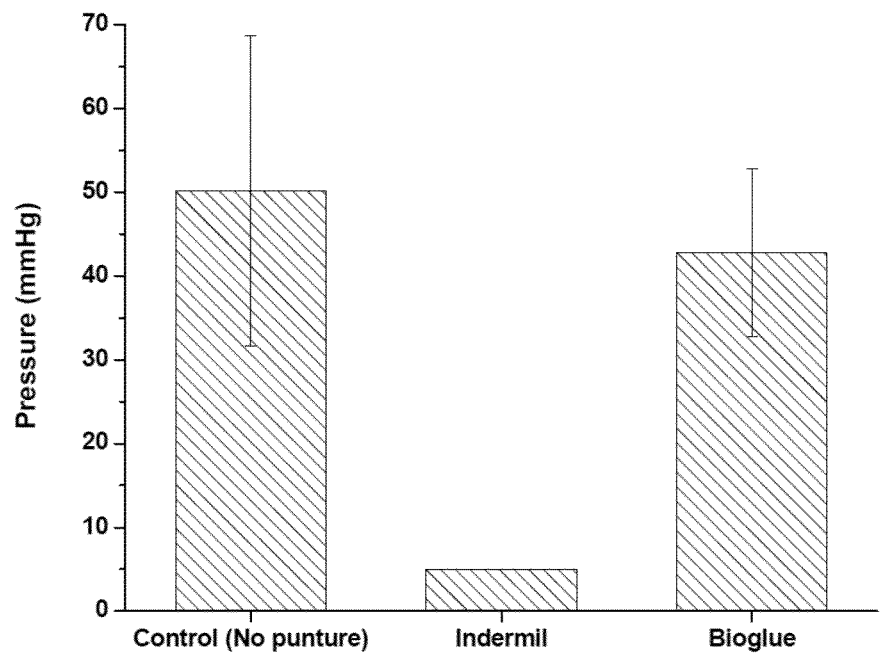
FIG. 12 shows data for the rupture/leak pressures of non-punctured fetal membrane (n=10), Indermil™ (n=5) and Bio-Glue™ (n=5); 23 g needle was used to insert through both the sealant and membrane. See Examples 2.5 and 2.6.

The ballistics gel (Vyse Gelatin Company, professional grade ballistic/ordnance gelatin) closely simulated the density and viscosity of human muscle tissue. Four centimeter thick-ballistics gel samples were used as a uterus muscle mimic. In order to test presealing capability of sealants, the poly(AA-co-AANHS-co-MDOPA) copolymer was placed between the fetal membrane and uterus muscle mimic (ballistics gel) as shown in FIG. 10. A 16 G (1.651 mm of outer diameter) needle was inserted through three layers of the ballistics gel, sealant and fetal membrane. The inserted needle was held in position for another minute to make sure the fetal membrane puncture. This waiting time also simulated the conditions of fetal surgery and amniocentesis. Though the fetal membrane was very resilient and tough, the secure puncture of needle was confirmed by endoscope which embedded to the artificial uterus. After removal of needle, internal water pressure was slowly increased to test the strength of sealing. If any leakage of water was observed, pressure increase was stopped immediately. Maximum pressure did not exceed 50 mmHg, because non-punctured fetal membrane demonstrated a critical pressure of membrane rupture at 50.15 mmHg in average. (FIG. 12)

Figure 11:
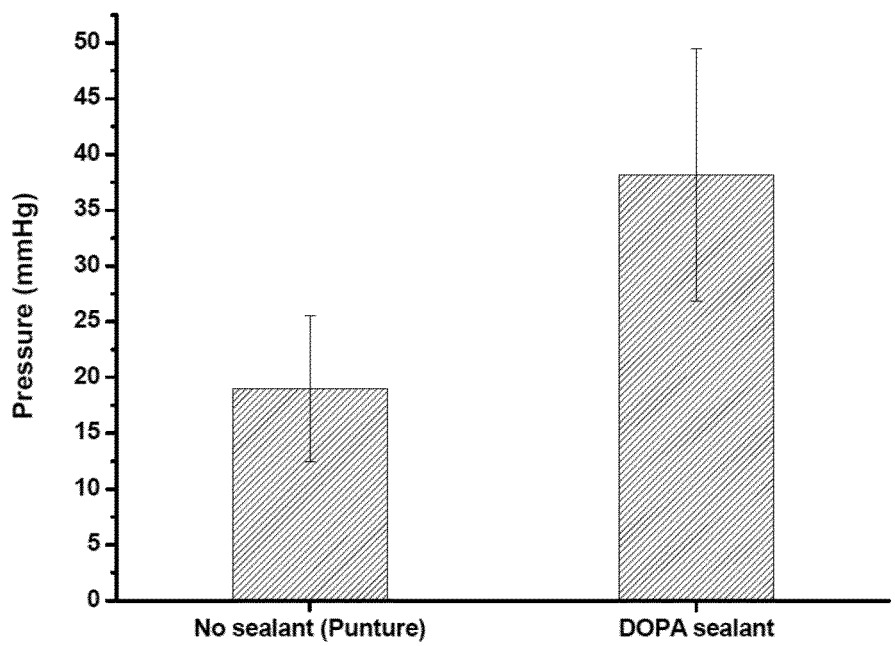
FIG. 11 shows the data for rupture/leak pressure of punctured fetal membrane (no sealant, n=3) and poly(AA-co-AANHS-co-MDOPA) presealed fetal membrane (DOPA sealant, n=5); 16 g needle was used to insert through the ballistics gel, sealant and fetal membrane. See Example 2.5.

As shown in FIG. 11, poly(AA-co-AANHS-co-MDOPA) sealed the needle puncture very successfully. Without poly(AA-co-AANHS-co-MDOPA), the needle punctured fetal membrane leaked at 19±6.5 mmHg. This pressure of 19±6 5 mmHg is higher pressure than the ordinary pressure of the amniotic sac, 5 mmHg, demonstrating that a certain degree of spontaneous closure of fetal membrane occur even without treatment. This happens mainly because of sliding of the two layers of fetal membranes (amnion and chorion) against each other. After sliding of two fetal membrane layers, it was observed that each layer covered the other layer's needle puncture to block the needle damage.

The use of the poly(AA-co-AANHS-co-MDOPA) demonstrated good sealing capability, 38.2±11.3 mmHg. Because ordinary fetal membrane burst at 50 mmHg, test pressures were held below this level even though there is no leakage. Three out of the 5 trials poly(AA-co-AANHS-co-MDOPA) reached this maximum 50 mmHg level. Thus, if the highest critical pressure of burst was measured above 50 mmHg, then the real average value of poly(AA-co-AANHS-co-MDOPA) sealed fetal membrane pressure would be much higher than 38.2 mmHg. Although the measured pressure is lower than real pressure, the sealing enhancement with poly(AA-co-AANHS-co-MDOPA) is statistically significant (p<0.01) compare to the natural spontaneous closure. (FIG. 11)

The enhancement of sealing capability with poly(AA-co-AANHS-co-MDOPA) is also clearly shown using dyes. In tests comparing punctures sealed using poly(AA-co-AANHS-co-MDOPA) and those not so sealed, methylene blue dye was mixed to water (amniotic fluid mimic) in order to easily identify any fluid leakage. The presented ballistics gel (transparent thick disk shape material in the image) was placed on human fetal membrane for the test. The first needle puncture was presealed with poly(AA-co-AANHS-co-MDOPA) and another puncture was not sealed. As the internal pressure of artificial uterus increased, the amniotic fluid mimic (blue color water) leaked through a needle puncture path. By contrast, the poly(AA-co-AANHS-co-MDOPA) sealed site did not show any sign of fluid leakage even until the internal pressure reach to the maximum pressure, 50 mmHg. The artificial uterus was disassembled after the completed test to observe the interface between fetal membrane and ballistics gel. The ballistics gel does not present any leakage from the poly(AA-co-AANHS-co-MDOPA) treated site.

Example 2.6

Fetal Membrane Presealing Capability of Commercially Available Medical Adhesives Two commercially available medical adhesives, Indermil™ and BioGlue™ were tested under conditions to those described above. As described above, the test system exhibited a maximum critical burst/leakage pressure of 50.15±18 4 mm Hg, and so tests were conducted at pressures lower than this for safety reasons. Further, test pressures did not exceed 50 mmHg because 50 mmHg is already too much higher than ordinary physiologic intrauterine pressure. In these tests which resulted in the data shown in FIG. 12, 23 G (0.6414 mm of outer diameter) needles were used to make the punctures.

Cyanoacrylate-based adhesive, Indermil™ provided very poor sealing capability of fetal membrane, showing only a critical pressure of 5 mm Hg. The main problem with Indermil™ was its poor wet adhesion properties. Also, because Indermil™ is very thin, it was diluted by the fluid on the wet surface and did not stay in one place. Indermil™ did not cure well on the fetal membrane; it generated a very stiff adhesion layer and the cured adhesive made the fetal membrane tissue with which it contacted stiff While Indermil™ is an efficient medical adhesive to treat outer skin scar, it was not suitable as a presealant of fetal membrane.

BioGlue™ is a two component bio-medical adhesive which consists of purified bovine serum albumin and glutaraldehyde. These two components were stored separately in a dual barrel syringe and were mixed in an applicator tip (mixing tip) upon injection. Although BioGlue™ showed a very high sealing capability, 42.8±10 0 mmHg, as shown in FIG. 12, it has several shortcomings Unlike Indermil™, Bio-Glue™ stuck well to the wet surface, but cured rapidly, offering the potential danger that if the clinician left the needle/fetoscope in the sealant too long, it would not seal or could permanently affix the needle/fetoscope to the sealant and tissue.

As those skilled in the art will appreciate, numerous modifications and variations of the present invention are possible in light of these teachings, and all such are contemplated hereby. For example, in addition to the embodiments described herein, the present invention contemplates and claims those inventions resulting from the combination of features of the invention cited herein and those of the cited prior art references which complement the features of the present invention. Similarly, it will be appreciated that any described material, feature, or article may be used in combination with any other material, feature, or article, and such combinations are considered within the scope of this invention.

The disclosures of each patent, patent application, and publication cited or described in this document are hereby incorporated herein by reference, each in its entirety, for all purposes.

What is claimed:

1. A medical adhesive composition for mammalian use, said composition comprising a copolymer comprising separate water-soluble units, interfacial adhesive units comprising 3,4-dihydroxy-phenyl alanine, and crosslinkable units comprising N-hydroxysuccinimide.

2. The medical adhesive composition of claim 1, the water-soluble units being derived from citraconic acid, itaconic acid, (meth)acrylamide, (meth)acrylic acid, 2-hydroxyethylmethacrylate, 2-hydroxyethylacrylate, polyethylene glycol (PEG) (meth)acrylate (PEG having 10-1000 MW), N-vinyl pyrrolidone, vinyl alcohol, N,N-dimethylacrylamide, ethylene glycol dimethacrylate, carboxybetaine, N-isopropylacrylamide, 2-aminoethyl methacrylate, 2-(dimethylamino)ethyl (meth)acrylamide, N-(3-aminopropyl)-(meth)acrylate, or mixtures thereof.

3. The medical adhesive composition of claim 1, the water-soluble units being derived from (meth)acrylic acid.

4. The medical adhesive composition of claim 1, the interfacial adhesive units further comprising hydroxy- or polyhydroxyphenyl moieties.

5. The medical adhesive composition of claim 1, the interfacial adhesive units comprising 3,4-dihydroxy-L-phenyl alanine moieties.

6. The medical adhesive composition of claim 1, the crosslinkable units further comprising maleimide, N-hydroxysuccinimide, amine, aldehyde, or thiol moeities.

7. The medical adhesive composition of claim 1, the separate water-soluble units, interfacial adhesive units, and crosslinkable units being randomly distributed throughout the copolymer.

8. The medical adhesive composition of claim 1, at least one set of the water-soluble units, interfacial adhesive units, or crosslinkable units being present as a block segment within the copolymer.

9. The medical adhesive composition of claim 1, the copolymer having been prepared by free radical polymerization, ring opening metathesis polymerization (ROMP), atom transfer radical polymerization (ATRP), nitroxide mediate polymerization (NMP), or reverse addition-fragmentation chain transfer polymerization (RAFT) of the respective monomers.

10. The medical adhesive composition of claim 1, the copolymer comprising a linear, comb shape graft (or brush) or branched multiarm architecture.

11. The medical adhesive composition of claim 1, the water-soluble units being present in a range of about 50 to about 95 mole percent, the interfacial adhesive units being present in a range of about 5 to about 50 mole percent, and the crosslinkable units being present in a range of about 0.001 to about 25 mole percent, in each case with respect to the total number of moles of repeating units in the copolymer.

12. The medical adhesive composition of claim 1, the copolymer being a terpolymer.

13. The medical adhesive composition of claim 12, the terpolymer being a copolymer of acrylic acid, acrylic acid N-hydroxysuccinimide ester, and N-methacryloyl 3,4-dihydroxy-phenylalanine.

14. The medical adhesive composition of claim 13, the terpolymer being a copolymer of acrylic acid (AA), acrylic acid N-hydroxysuccinimide ester (AANHS), and (C) N-methacryloyl 3,4-dihydroxy-phenylalanine (MDOPA), wherein the mole ratio of AA:AANHS:MDOPA is about 70:15:15.

15. The medical adhesive of claim 14, the copolymer being admixed with water to form a water-swollen adhesive.

16. The medical adhesive composition of claim 15, the composition exhibiting shear thinning behavior at (a) a shear rate of greater than 70 $s^{-1}$ at 23° C. or (b) at a shear rate of greater than 30 $s^{-1}$ at 38° C. or (c) both (a) and (b).

17. The medical adhesive composition of claim 16, further comprising a crosslinking agent, the crosslinking agent capable of forming covalent bonds with the crosslinkable units present in the copolymer.

18. The medical adhesive composition of claim 16, the at least one copolymer crosslinked by a crosslinking agent, the crosslinking agent having formed covalent bonds with the crosslinkable units present in the copolymer.

19. The medical adhesive composition of claim 17 or 18, the covalent bonds resulting from a maleimide-thiol group reaction, an N-hydroxysuccinimide ester-thiol group reaction, an amine-aldehyde group reaction, or a transglutaminase enzyme-amine group reaction.

20. The medical adhesive composition of claim 19, the crosslinking agent being a molecule having two, three, or four reactive sites per molecule.

21. The medical adhesive composition of claim 20, the crosslinking agent being a thiol derivative of ethoxylated glycerol, trimethylol propane, or pentaerythritol, and the covalent bonds resulting from an N-hydroxysuccinimide ester-thiol group reaction.

22. The medical adhesive composition of claim 21, the composition acceptable for human use.

23. A method of preparing a medical adhesive composition, said method comprising copolymerizing a homogeneous mixture of acrylic acid (AA), acrylic acid N-hydroxysuccinimide ester (AANHS), and (C) N-methacryloyl 3,4-dihydroxy-phenylalanine (MDOPA) in a solvent in the present of a free radical initiator to form a solid copolymer.

24. The method of claim 23, further comprising separating the solid copolymer from the reaction mixture.

25. The method of claim 24, further comprising swelling the solid copolymer with water to form a water-swollen adhesive.

26. The method of claim 25, further comprising admixing a thiol-PEG crosslinking agent with the water-swollen adhesive.

27. A medical adhesive composition prepared by the method of claim 21.

28. A kit comprising a sterile package containing a medical adhesive composition of claim 1 or 15 and a crosslinking agent.

29. The kit of claim 28, the medical adhesive composition and crosslinking agent adapted and acceptable for human use.

30. A method for attaching two substrates to one another, the method comprising contacting each substrate with a composition of claim 15 or 17 for a time sufficient that the substrates are attached to one another.

31. The method of claim 30, further comprising admixing the composition of claim 17 with a crosslinking agent.

32. The method of claim 31, the composition of claim 15 and the crosslinking agent being admixed before applying to either of the two substrates.

33. The method of claim 30, at least one of the two substrates comprising a biological tissue surface.

34. The method of claim 30, at least one of the two substrates being a dermal or mucosal tissue surface.

35. The method of claim 30, at least one of the two substrates comprising an internal membrane tissue surface.

36. The method of claim 30, at least one of the two substrates comprising a mammalian tissue surface.

37. The method of claim 30, at least one of the two substrates being a non-biological surface.

* * * * *